United States Patent
Tanizawa et al.

(10) Patent No.: US 10,341,660 B2
(45) Date of Patent: Jul. 2, 2019

(54) VIDEO COMPRESSION APPARATUS AND VIDEO PLAYBACK APPARATUS

(71) Applicant: Kabushiki Kaisha Toshiba, Minato-ku (JP)

(72) Inventors: Akiyuki Tanizawa, Kawasaki (JP); Tomoya Kodama, Kawasaki (JP); Takeshi Chujoh, Kawasaki (JP); Shunichi Gondo, Tokyo (JP); Wataru Asano, Yokohama (JP); Takayuki Itoh, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 461 days.

(21) Appl. No.: 14/835,890

(22) Filed: Aug. 26, 2015

(65) Prior Publication Data

US 2016/0065993 A1  Mar. 3, 2016

(30) Foreign Application Priority Data

Aug. 26, 2014  (JP) ................... 2014-171964

(51) Int. Cl.
*H04N 19/119* (2014.01)
*H04N 19/30* (2014.01)
(Continued)

(52) U.S. Cl.
CPC ......... *H04N 19/119* (2014.11); *H04N 19/146* (2014.11); *H04N 19/162* (2014.11);
(Continued)

(58) Field of Classification Search
CPC .................................................... H04N 19/119
See application file for complete search history.

(56) References Cited

U.S. PATENT DOCUMENTS

2006/0209959 A1  9/2006  Sun
2008/0152245 A1*  6/2008  El-Maleh ........... H04N 21/4621
                                                        382/254
(Continued)

FOREIGN PATENT DOCUMENTS

JP  2004-96309 A   3/2004
JP  2007-235314 A  9/2007
(Continued)

OTHER PUBLICATIONS

Office Action dated May 16, 2017 in Japanese Patent Application No. 2014-171964.
(Continued)

*Primary Examiner* — Rowina J Cattungal
(74) *Attorney, Agent, or Firm* — Oblon, McClelland, Maier & Neustadt, L.L.P.

(57) ABSTRACT

According to an embodiment, a video compression apparatus includes a first compressor, a second compressor, a partitioner and a communicator. The first compressor compresses a first video to generate a first bitstream. The second compressor sets regions in a second video and compresses the regions so as to enable each region to be independently decoded, to generate a second bitstream. The partitioner partitions the second bitstream according to the set regions to obtain a partitioned second bitstream. The communicator receives region information indicating a specific region that corresponds to one or more regions and selects and transmits a bitstream corresponding to the specific region from the partitioned second bitstream.

20 Claims, 19 Drawing Sheets

(51) Int. Cl.
*H04N 19/37* (2014.01)
*H04N 19/146* (2014.01)
*H04N 19/162* (2014.01)
*H04N 19/164* (2014.01)
*H04N 19/17* (2014.01)
*H04N 21/2343* (2011.01)
*H04N 21/2365* (2011.01)
*H04N 21/24* (2011.01)
*H04N 21/4728* (2011.01)
*H04N 21/6332* (2011.01)
*H04N 21/6587* (2011.01)

(52) U.S. Cl.
CPC .......... *H04N 19/164* (2014.11); *H04N 19/17* (2014.11); *H04N 19/30* (2014.11); *H04N 19/37* (2014.11); *H04N 21/2365* (2013.01); *H04N 21/234327* (2013.01); *H04N 21/2402* (2013.01); *H04N 21/4728* (2013.01); *H04N 21/6332* (2013.01); *H04N 21/6587* (2013.01)

(56) References Cited

U.S. PATENT DOCUMENTS

| | | | |
|---|---|---|---|
| 2008/0165861 A1* | 7/2008 | Wen | H04N 19/139 375/240.26 |
| 2010/0296001 A1 | 11/2010 | Kwon et al. | |
| 2011/0243252 A1 | 10/2011 | Mito et al. | |
| 2014/0307775 A1* | 10/2014 | Ouedraogo | H04N 19/159 375/240.02 |
| 2014/0341549 A1* | 11/2014 | Hattori | H04N 19/70 386/354 |
| 2015/0078436 A1 | 3/2015 | Chujoh et al. | |
| 2015/0113483 A1* | 4/2015 | Van Der Westhuizen | G06F 3/04812 715/850 |
| 2016/0309156 A1* | 10/2016 | Park | H04N 19/597 |

FOREIGN PATENT DOCUMENTS

| | | |
|---|---|---|
| JP | 2010-16911 A | 1/2010 |
| JP | 2010-515300 A | 5/2010 |
| JP | 2011-109176 A | 6/2011 |
| JP | 2011-217272 A | 10/2011 |
| JP | 2011-254219 A | 12/2011 |
| JP | 2012-85350 A | 4/2012 |
| JP | 2012-120199 A | 6/2012 |
| JP | 2013-51737 A | 3/2013 |
| JP | 2013-132048 A | 7/2013 |
| JP | 2013-229806 A | 11/2013 |
| JP | 2014-27409 A | 2/2014 |
| JP | 5478346 B2 | 4/2014 |
| JP | 5487074 B2 | 5/2014 |
| JP | 2015-61197 A | 3/2015 |
| WO | WO 2014/001246 A1 | 1/2014 |
| WO | WO 2014/051712 A1 | 4/2014 |

OTHER PUBLICATIONS

Naofumi Uchihara, et al., "A Study on Video Delivery System with Free View-Area and Multiple Resolution Access for Multiple Users" IEICE Technical Report, The Institute of Electronics, Information and Communication Engineers, vol. 109, No. 398, 2010, pp. 89-94 (with English Abstract and English language translation).

Jianle Chen, et al., "SHVC Test Model 2 (SHM 2)" Joint Collaborative Team on Video Coding (JCT-VC) of ITU-T SG16 WP3 and ISO/IEC JTC1/SC29/WG11, JCTVC-M1007_v1, Apr. 2013, 7 pages.

Davy De Schrijver, et al. "Exploitation of Interactive Region of Interest Scalability in Scalable Video Coding by Using an XML-driven Adaptation Framework", $2^{nd}$ International Conference on Automated Production of Cross Media Content for Multi-Channel Distribution, Dec. 31, 2006, pp. 2-10.

* cited by examiner

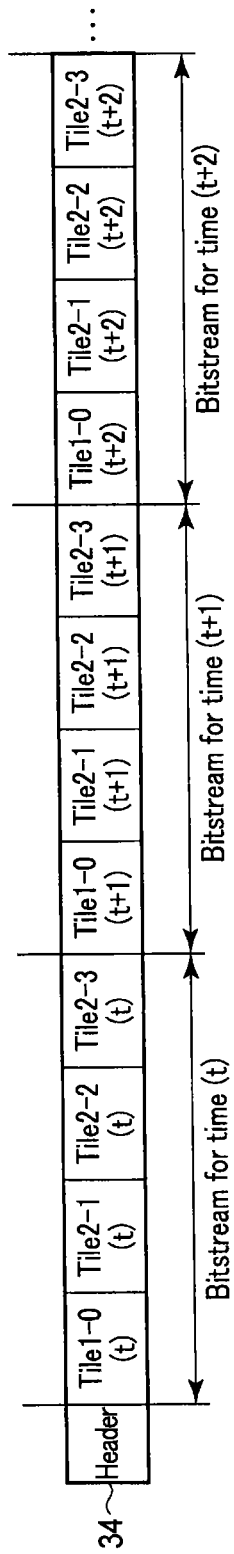
F I G. 12

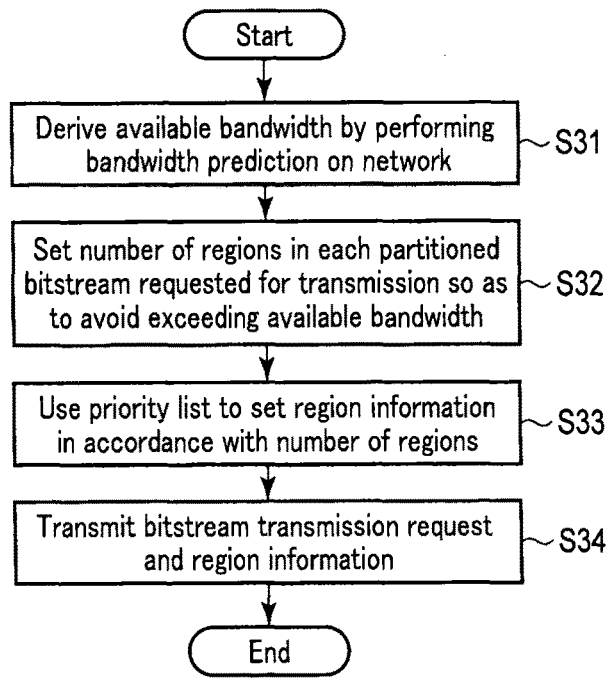
F I G. 16
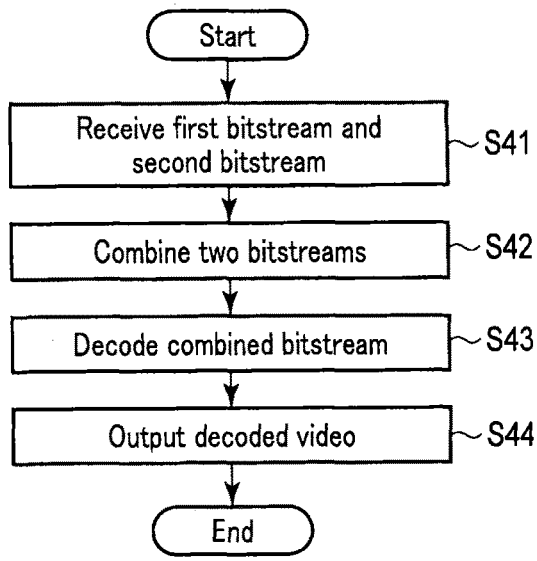
F I G. 17

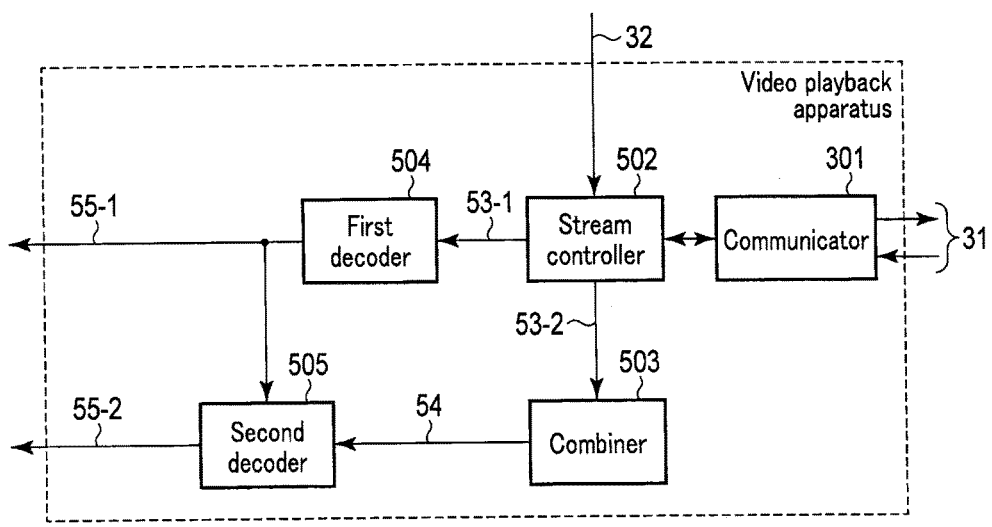
F I G. 20

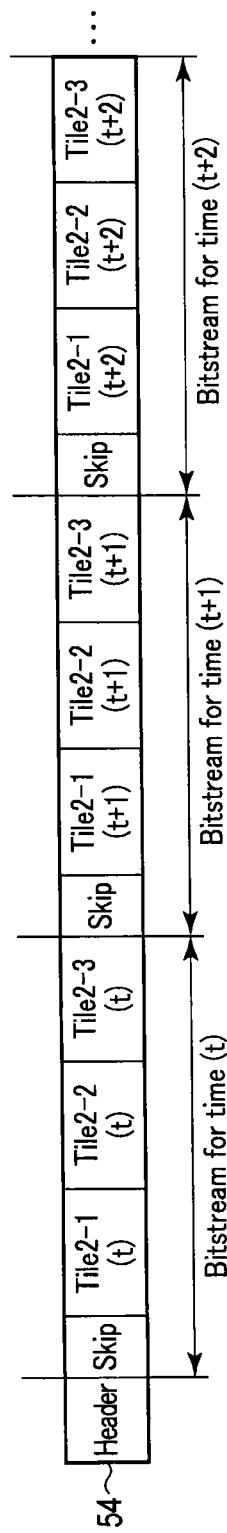
F I G. 22

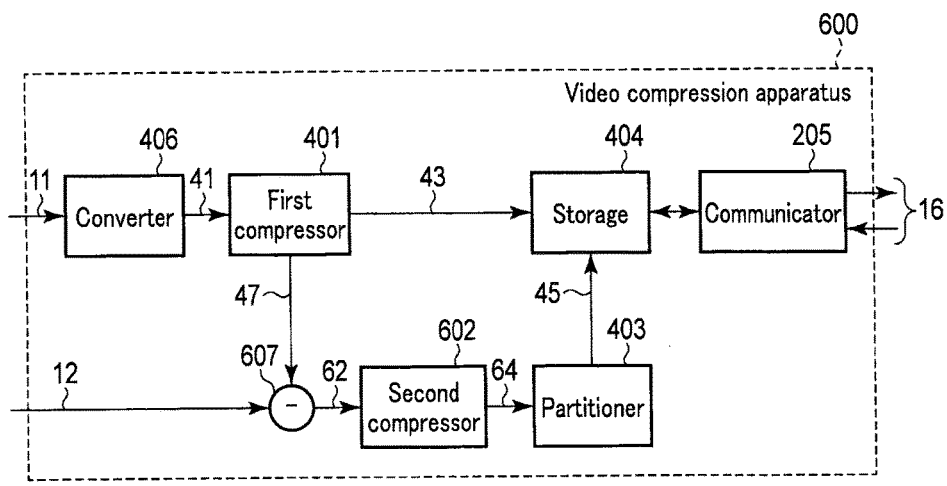
F I G. 26
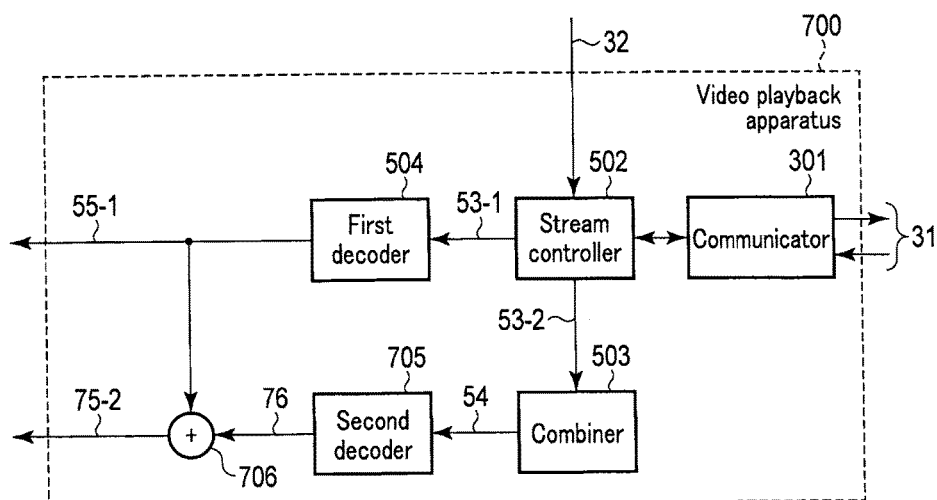
F I G. 27

VIDEO COMPRESSION APPARATUS AND VIDEO PLAYBACK APPARATUS

CROSS-REFERENCE TO RELATED APPLICATIONS

This application is based upon and claims the benefit of priority from Japanese Patent Application No. 2014-171964, filed Aug. 26, 2014, the entire contents of which are incorporated herein by reference.

FIELD

Embodiments relate to video compression and video playback.

BACKGROUND

In recent years, an adaptive streaming technique has been developed in which the image quality of a video to be distributed via Web browsers is changed in accordance with the bandwidth of a network (for example, the Internet) to allow the video to be played without interruption. In general, the bandwidth of the Internet varies irregularly due to various factors such as the number of users and surrounding environments. The adaptive streaming enables continuous video playback without significant quality degradation by predicting the available bandwidth and adaptively selecting a bitstream commensurate with an available bandwidth.

The adaptive streaming technique is roughly divided into a dynamic encoding type and a pre-recorded type. In the dynamic encoding technique, a video server adaptively generates a bitstream for distribution based on the predicted bandwidth. The dynamic encoding technique is suitable for one-to-one video delivery. The video server needs to compress the video in real time based on the predicted bandwidth. On the other hand, in the pre-recoded adaptive streaming technique, the video client adaptively selects and requests a bitstream for distribution from a plurality of bitstreams provided in the video server, based on the available bandwidth derived by means of bandwidth prediction. The pre-recorded adaptive streaming technique is suitable for one-to-many video delivery. However, the video server needs to prepare a plurality of bitstreams with different bit rates beforehand.

Normally, the degree of attention paid by a user to a video on a screen is not uniform. Thus, in video delivery, in order to efficiently improve the subjective image quality of a displayed image, it is useful to preferentially enhance the image quality of a specific region, for example, an ROI (Region Of Interest), compared to the image quality of other regions. However, in order to achieve such local image quality control in the conventional pre-recorded adaptive streaming technique, the video server needs to prepare a substantial number of bitstreams. In particular, an enormous total number of bitstreams may be needed to allow the specific region to be optionally selected. The number of compression apparatuses needed, the capacity of storage, and the like increase consistently with the total number of bitstreams. This increases the costs of the video server.

BRIEF DESCRIPTION OF THE DRAWINGS

FIG. 12 is a diagram illustrating a combined bitstream;
FIG. 16 is a flowchart illustrating a video request process executed by the video playback apparatus in FIG. 8;
FIG. 17 is a flowchart illustrating a video playback process executed by the video playback apparatus in FIG. 8;
FIG. 20 is a block diagram illustrating a video playback apparatus according to the second embodiment;
FIG. 22 is a diagram depicting a modification of the combined bitstream in FIG. 21;
FIG. 26 is a block diagram illustrating a video compression apparatus according to a third embodiment;
FIG. 27 is a block diagram illustrating a video playback apparatus according to the third embodiment.

DETAILED DESCRIPTION

Figure 1:
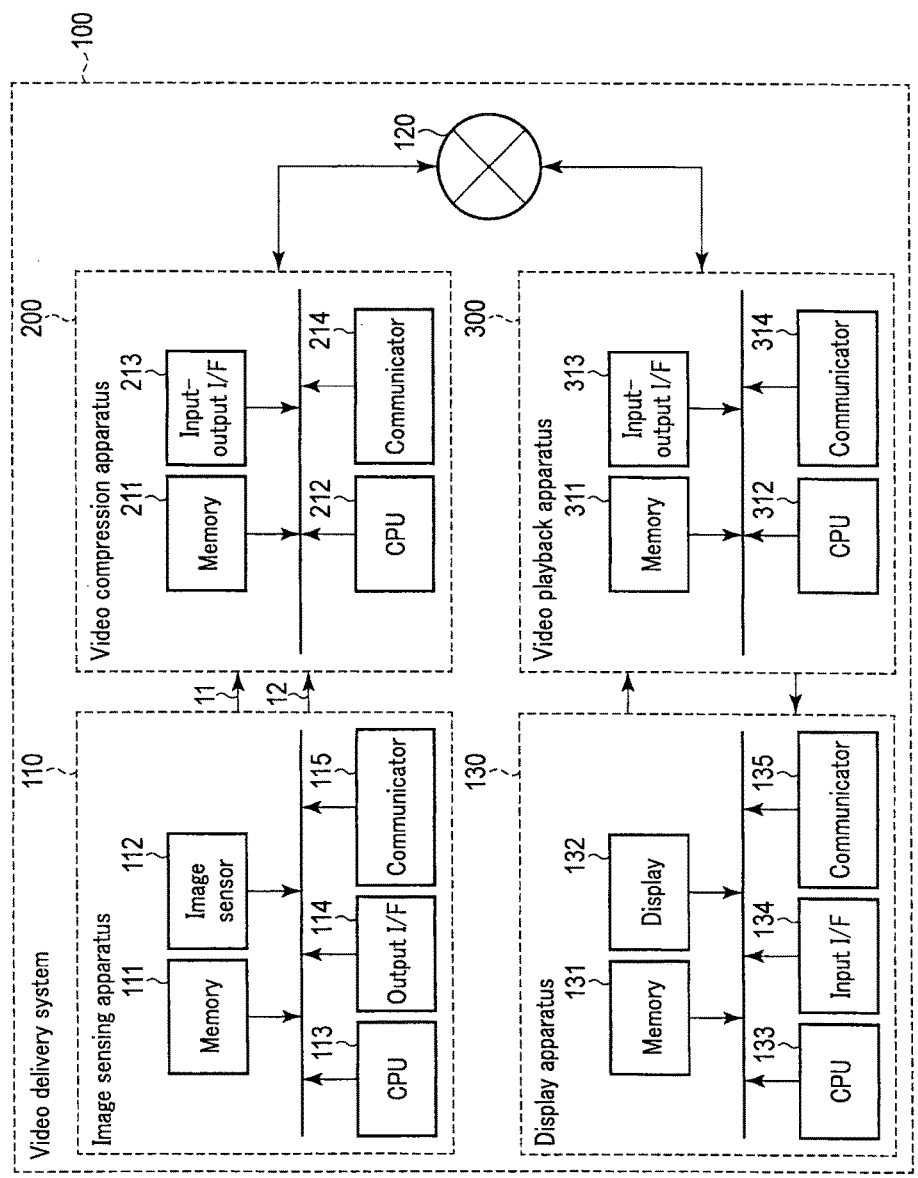
FIG. 1 is a block diagram illustrating a video delivery system according to a first embodiment.

Embodiments will be described below with reference to the drawings.

According to an embodiment, a video compression apparatus includes a first compressor, a second compressor, a partitioner and a communicator. The first compressor compresses a first video to generate a first bitstream. The second compressor sets regions in a second video and compresses the regions so as to enable each region to be independently decoded, to generate a second bitstream. The partitioner partitions the second bitstream according to the set regions to obtain a partitioned second bitstream. The communicator receives region information indicating a specific region that corresponds to one or more regions and selects and transmits a bitstream corresponding to the specific region from the partitioned second bitstream.

Elements identical or similar to corresponding described elements are denoted by identical or similar reference numerals, and duplicate descriptions are basically omitted. Furthermore, the term "video" may be replaced with a term such as "image", "pixel", "image signal", "picture", or "image data" as needed. Moreover, the term "compression" may be replaced with the term "encoding" as needed.

First Embodiment

As illustrated in FIG. 1, a video delivery system 100 includes an image sensing apparatus 110, a video compression apparatus 200, a channel 120, a video playback apparatus 300, and a display apparatus 130.

The image sensing apparatus 110 generates a first video 11 and a second video 12. The first video 11 and the second video 12 may be the same videos. The image sensing apparatus 110 outputs the first video 11 and the second video 12 to the video compression apparatus 200. The image sensing apparatus 110 typically corresponds to a camera or an image sensor and takes an optical image of a subject to generate a still image or a moving picture as a (natural) image. The image sensing apparatus 110 may be replaced with any video generation apparatus that generates computer graphics (CG) videos used for video games and the like, and synthetic videos of the CG videos and natural videos. Alternatively, the image sensing apparatus 110 may be replaced with a video storage in which videos generated by another image sensing apparatus or video generation apparatus are saved.

As depicted in FIG. 1, the image sensing apparatus 110 includes a memory 111, an image sensor 112, a CPU (Central Processing Unit) 113, an output I/F (Interface) 114, and a communicator 115.

In the memory 111, programs executed by the CPU 113 and data transmitted and received by the communicator 115 are temporarily saved. The image sensor 112 takes an optical image of a subject to generate a video signal.

The CPU 113 executes programs to operate as various functional units. Specifically, the CPU 113 converts video signals generated by the image sensor 112 into a digital format and executes demosaicing processing. The output I/F 114, for example, outputs videos to an external apparatus such as the video compression apparatus 200. The communicator 115 exchanges data with the external apparatus.

Any of the elements of the image sensing apparatus 110 depicted in FIG. 1 may be deleted as needed or elements not depicted in the drawings may be added to the image sensing apparatus 110 as needed. For example, when the communicator 115 transmits videos to the video compression apparatus 200, the output I/F 114 may be deleted. On the other hand, when videos needs to be saved inside the image sensing apparatus 110, storage such as an HDD (Hard Disk Drive) or an SSD (Solid State Drive) may be added to the image sensing apparatus 110.

The video compression apparatus 200 receives the first video 11 and the second video 12 from the image sensing apparatus 110. The video compression apparatus 200 sets a plurality of regions described below in each of the first and second videos 11 and 12, and compresses the first video 11 and the second video 12 to obtain a first bitstream 13 and a second bitstream 14 shown in FIG. 2, respectively. The video compression apparatus 200 compresses each of the first and second videos 11 and 12 so as to enable each of the plurality of set regions to be independently decoded. Enabling each region to be independently decoded means enabling compressed data for a certain region to be decoded without the need for the compressed data for the other regions. The video compression apparatus 200 partitions the first bitstream 13 and the second bitstream 14 into the regions to obtain a partitioned first bitstream 15-1 and a partitioned second bitstream 15-2. The video compression apparatus 200 saves the partitioned first bitstream 15-1 and the partitioned second bitstream 15-2.

Upon receiving a bitstream transmission request and region information described below from the video playback apparatus 300 via the channel 120, the video compression apparatus 200 selects a bitstream corresponding to the region information from the partitioned first bitstream 15-1 and the partitioned second bitstream 15-2. Then, the video compression apparatus 200 transmits the selected bitstream to the video playback apparatus 300 via the channel 120.

As depicted in FIG. 1, the video compression apparatus 200 physically includes a memory 211, a CPU 212, an input-output I/F 213, and a communicator 214.

In the memory 212, programs executed by the CPU 212 and data to be transmitted and received by the communicator 214 are temporarily saved. The CPU 212 operates as various functional units. Specifically, the CPU 212 executes, for example, a video compression process and a video delivery process described below.

The input-output I/F 213, for example, receives videos from an external apparatus such as the image sensing apparatus 110 and outputs bitstreams to an external apparatus such as the video playback apparatus 300. The communicator 214 exchanges data with the external apparatus.

Any of the elements of the video compression apparatus 200 depicted in FIG. 1 may be deleted as needed or elements not depicted in the drawings may be added to the video compression apparatus 200 as needed. For example, when the communicator 214 receives videos from the image sensing apparatus 110 and transmits bitstreams to the video playback apparatus 300, the input-output I/F 213 may be deleted. On the other hand, in order to save videos or bitstreams inside the video compression apparatus 200, storage such as an HDD or an SSD may be added to the video compression apparatus 200.

The video compression apparatus 200 can be functionally divided as needed. For example, the video compression apparatus 200 may serve to fulfill a part (video compression function) of the above-described function, whereas a video delivery apparatus separate from the video compression apparatus may serve to fulfill the remaining part (video delivery function) of the function.

The channel 120 is a network that connects the video compression apparatus 200 and the video playback apparatus 300 together. The channel 120 is a communication resource available for information transmission. The channel 120 may be a wired channel, a wireless channel, or a mixed channel of the wired channel and the wireless channel. The channel 120 may be, for example, an Internet network, a terrestrial broadcasting network, or a satellite network. Furthermore, the channel 120 may be a channel for various communications such as communication using cables, radio communication, PHS (Personal Handy-phone System), 3G ($3^{rd}$ Generation), 4G ($4^{th}$ Generation), LTE (Long Term Evolution), millimeter wave communication, and radar communication.

The video playback apparatus 300 transmits the bitstream transmission request and region information to the video compression apparatus 200 via the channel 120. Then, the video playback apparatus 300 receives a bitstream (at least one of a first bitstream 33-1 and a second bitstream 33-2) corresponding to the bitstream transmission request and region information via the channel 120. The bitstream is partitioned into regions by the video compression apparatus 200. The video playback apparatus 300 combines such bitstreams together to obtain a combined bitstream 34 shown in FIG. 8. The video playback apparatus 300 decodes the combined bitstream 34 to obtain a decoded video 35 shown in FIG. 8. The video playback apparatus 300 outputs the decoded video 35 to the display apparatus 130.

As depicted in FIG. 1, the video playback apparatus 300 physically includes a memory 311, a CPU 312, an input-output I/F 313, and a communicator 314.

In the memory 311, programs executed by the CPU 312 and data transmitted and received by the communicator 314 are temporarily saved. The CPU 312 operates as various functional units. Specifically, the CPU 312 executes, for example, a video request process and a video playback process described below.

The input-output I/F 313, for example, receives bitstreams from an external apparatus such as the video compression apparatus 200 and outputs decoded videos to an external apparatus such as the display apparatus 130. The communicator 314 exchanges data with the external apparatus.

Any of the elements of the video playback apparatus 300 depicted in FIG. 1 may be deleted as needed or elements not depicted in the drawings may be added to the video playback apparatus 300 as needed. For example, when the communicator 214 receives bitstreams from the video compression apparatus 200 and outputs decoded videos to the display apparatus 130, the input-output I/F 313 may be deleted. On the other hand, in order to save bitstreams or decoded videos inside the video playback apparatus 300, storage such as an HDD or an SSD may be added to the video playback apparatus 300.

The display apparatus 130 receives the decoded video 35 from the video playback apparatus to display the decoded video 35. The display apparatus 130 typically corresponds to a display, a television receiver, or a video monitor. The display apparatus 130 may be a touch screen or the like which has an I/F function in addition to a video display function.

As depicted in FIG. 1, the display apparatus 130 includes a memory 131, a display 132, a CPU 133, an input I/F 134, and a communicator 135.

In the memory 131, programs executed by the CPU 133 and data transmitted and received by the communicator 135 are temporarily saved. The display 132 displays videos.

The CPU 133 executes programs to operate as various functional units. Specifically, the CPU 133 enlarges or reduces the decoded video 35 received from the display apparatus 130.

The input I/F 134 is an interface that allows a user to input, for example, a user request 32 (see FIG. 8) to the video playback apparatus 300. The input I/F 134 may be, for example, a mouse, a touch pad, a touch screen, or a stylus. The communicator 135 exchanges data with the external apparatus.

Any of the elements of the display apparatus 130 depicted in FIG. 1 may be deleted as needed or elements not depicted in the drawings may be added to the display apparatus 130 as needed. For example, when the decoded video 35 needs to be saved inside the display apparatus 130, storage such as an HDD or an SSD may be added to the display apparatus 130.

Figure 2:
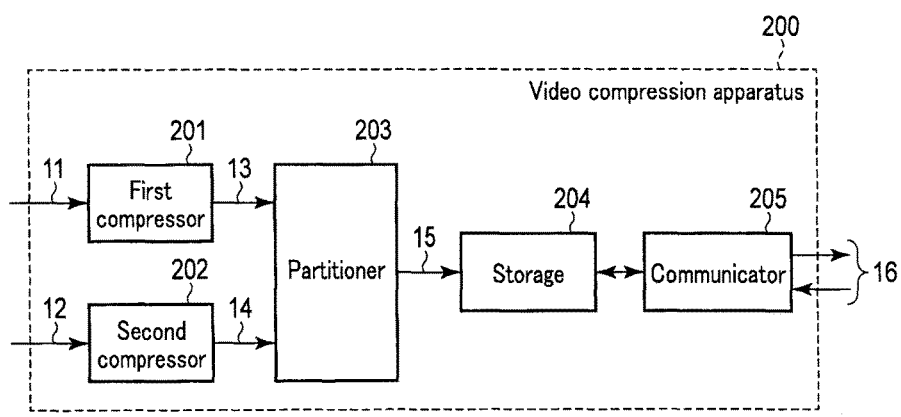
FIG. 2 is a block diagram illustrating a video compression apparatus according to the first embodiment.

As depicted in FIG. 2, the video compression apparatus 200 functionally includes a first compressor 201, a second compressor 202, a partitioner 203, storage 204, and a communicator 205.

The first compressor 201 receives the first video 11 from the image sensing apparatus 110. The first compressor 201 sets a plurality of regions for the first video 11. Then, in order to enable each of the plurality of set regions to be independently decoded, the first compressor 201 compresses the first video 11 for each region to obtain the first bitstream 13. The first compressor 201 outputs the first bitstream 13 to the partitioner 203.

Compressed video data is hereinafter treated in the form of a bitstream, and the term "bitstream" basically refers to compressed video data. Compressed audio data, information on a video, information on a playback scheme, information on a channel, information on a multiplexing scheme, and the like may be treated in the form of a bitstream.

The bitstream may be stored in a multimedia container. The multimedia container is a file format that allows compressed data such as videos and audio (that is, bitstreams) to be stored. The multimedia container may be as specified in, for example, MPEG (Moving Picture Experts Group)-2 System, MP4 (MPEG-4 Part 14), MPEG-DASH (Dynamic Adaptive Streaming over HTTP), and ASF (Advanced Systems Format). Furthermore, compressed data includes a plurality of bitstreams or segments, and one file may be created for every segment or for every plurality of segments.

The second compressor 202 receives the second video 12 from the image sensing apparatus 110. The second compressor 202 sets a plurality of regions for the second video 12. Then, in order to enable each of the plurality of set regions to be independently decoded, the second compressor 202 compresses the second video 11 for each region to obtain the second bitstream 14. The second compressor 202 outputs the second bitstream 14 to the partitioner 203.

The first bitstream 13 and the second bitstream 14 are different from each other in bit rate. For example, the first bitstream 13 has a bit rate of 1 Mbps, and the second bitstream 14 has a bit rate of 5 Mbps. In this regard, when the first video 11 and the second video 12 are the same, the decoded video of the second bitstream 14 normally has a higher image quality than the decoded video of the first bitstream 13.

A first partition scheme for regions set by the first compressor 201 for a first picture included in the first video 11 is preferably the same as a second partition scheme for regions set by the second compressor 202 for a second picture (for example, the picture of the same time as that of the first picture) included in the second video 12.

The first partition scheme may be fixed or variable in the first video 11. Similarly, the second partition scheme may be fixed or variable in the second video 12. For example, the first partition scheme and the second partition scheme may be changed depending on the video formats (for example, size or frame rate) of the first video 11 and the second video 12, respectively. The first partition scheme and the second partition scheme may be determined in accordance with the user's setting or may be automatically changed, for example, depending on the resource of the system.

In pre-recorded adaptive streaming, a bitstream for delivery may be switched at a particular random access point. Hence, the first partition scheme and the second partition scheme are preferably not changed for a picture positioned between adjacent random access points (that is, in the middle of a segment). In other words, the first partition scheme and the second partition scheme are preferably changed for a picture positioned at a random access point.

Figure 3:
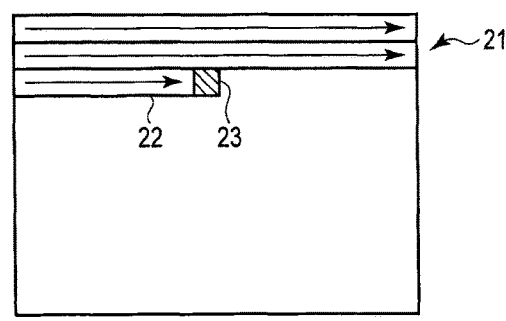
FIG. 3 a diagram illustrating a video encoding scheme.

A video encoding scheme (codec) supported by the first compressor 201 and the second compressor 202 is not particularly limited. In a typical codec, an encoding target image 21 is encoded in units of predetermined blocks as illustrated in FIG. 3. In the example in FIG. 3, the encoding target block 23 is determined in order of raster scan.

As described above, the first compressor 201 compresses the first video 11 for each of the plurality of set regions so as to enable each region to be independently decoded. The second compressor 202 compresses the second video 12 for each of the plurality of set regions so as to enable each region to be independently decoded. Hence, blocks positioned in rows above the encoding target block 23 and blocks positioned to the left of the encoding target block 23 in the same row as that in which the encoding target block 23 is located correspond to an encoded region 22. Generally speaking, encoding of the target block 23 refers the encoded region 22 to eliminate redundancy contained within the target image itself. Thus, to generate independently decodable partitions, there needs to encode not to refer other partitions.

Figure 4:
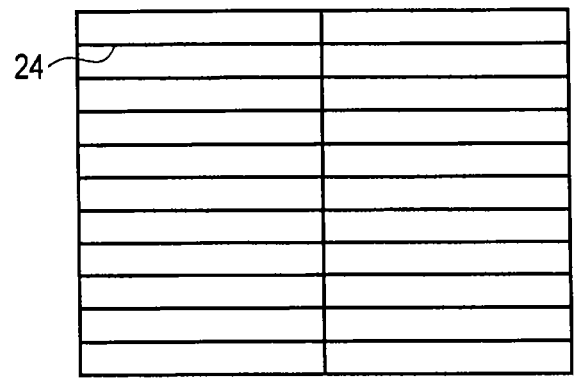
FIG. 4 is a diagram illustrating slices.

The regions may correspond to slices 24 illustrated in FIG. 4. The slice is specified in ITU-T REC. H.264 and ISO/IEC 14496-10 (hereinafter simply referred to as "H.264"), which have been jointly recommended by ITU-T (International Telecommunication Union Telecommunication Standardization Sector) and ISO (International Organization for Standardization)/IEC (International Electrotechnical Commission). Each slice is not affected by the other slices and can be independently compressed. Any slice can be independently decoded. That is, a bitstream for each slice does not depend on the bitstreams for the other slices. Thus, any slice can be decoded without the need for the bitstreams for the other slices.

Figure 5:
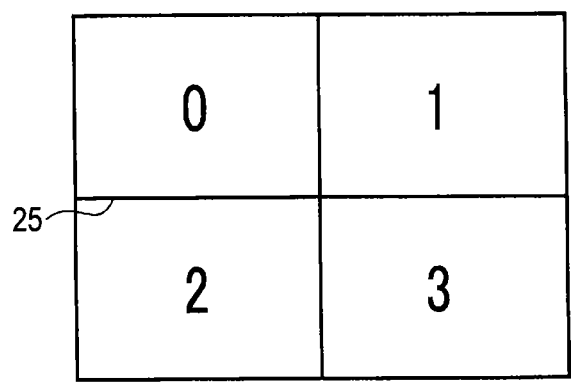
FIG. 5 is a diagram illustrating tiles.

Alternatively, the regions may correspond to tiles 25 illustrated in FIG. 5. The tile is specified in ITU-T REC. H.265 and ISO/IEC 23008-2 (hereinafter simply referred to as "HEVC") jointly recommended by ITU-T and ISO/IEC. HEVC is a codec that allows encoding efficiency to be substantially improved compared to H.264 described above, and makes tile partition available in addition to the above-described slice partition. The tiles are regions shaped like any rectangles into which an encoding target image is partitioned.

Two schemes are available for tile partition. According to a first scheme, the encoding target image is partitioned into tiles, and each of the tiles is further partitioned into slices. According to a second scheme, the encoding target image is partitioned into slices, and each of the slices is further partitioned into tiles. Regardless of the scheme for tile partition, each tile or each slice can be compressed in tile units or slice units so as to be able to be independently decoded. In the example in FIG. 5, the encoding target image is partitioned into four tiles, and each tile is partitioned into one slice. "0", "1", "2", and "3" depicted in FIG. 5 are information identifying the tiles (also referred to as tile numbers). This partition scheme is hereinafter adopted.

According to H.264 and HEVC, compressed data is collectively transmitted in packets referred to as NAL (Network Abstraction Layer) units, using a system layer. In the system layer, data is handled for each NAL unit. A decoder (included in the video playback apparatus 300) can roughly know the contents of a given NAL unit based on header information in the NAL unit and information in the multimedia container. The slices are organized into individual NAL units and can each be independently decoded. Thus, the decoder need not decode all of the bitstreams in the form of compressed video data but may extract and decode needed NAL units.

The partitioner 203 receives the first bitstream 13 from the first compressor 201 and receives the second bitstream 14 from the second compressor 202. The partitioner 203 partitions the first bitstream 13 into regions and arranges each of the partitioned bitstreams into a regular format (for example, adds appropriate header information to the partitioned bitstream) to generate a partitioned first bitstream 15-1. The partitioned first bitstream 15-1 includes bitstreams for the regions. Similarly, the partitioner 203 partitions the second bitstream 14 into regions and arranges each of the partitioned bitstreams into a regular format to generate a partitioned second bitstream 15-2. The partitioned second bitstream 15-2 includes bitstreams for the regions. The partitioner 203 outputs a partitioned bitstream 15 (including the partitioned first bitstream 15-1 and the partitioned second bitstream 15-2) to the storage 204.

Figure 6:
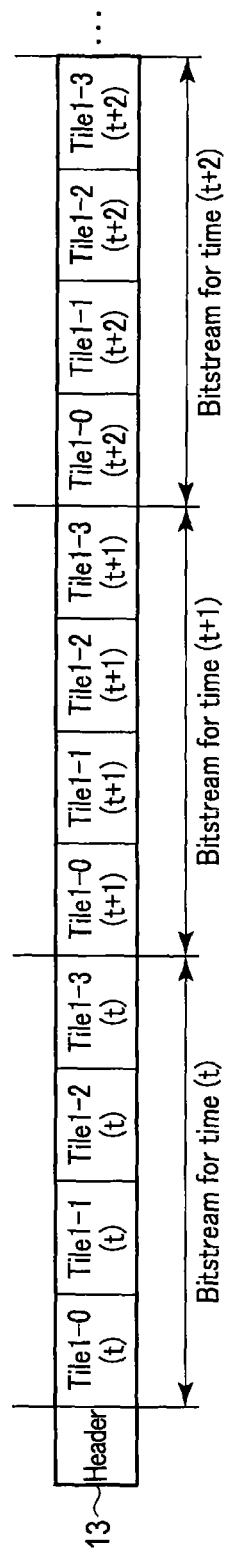
FIG. 6 is a diagram illustrating a first bitstream generated in the video compression apparatus in FIG. 2.
Figure 7:
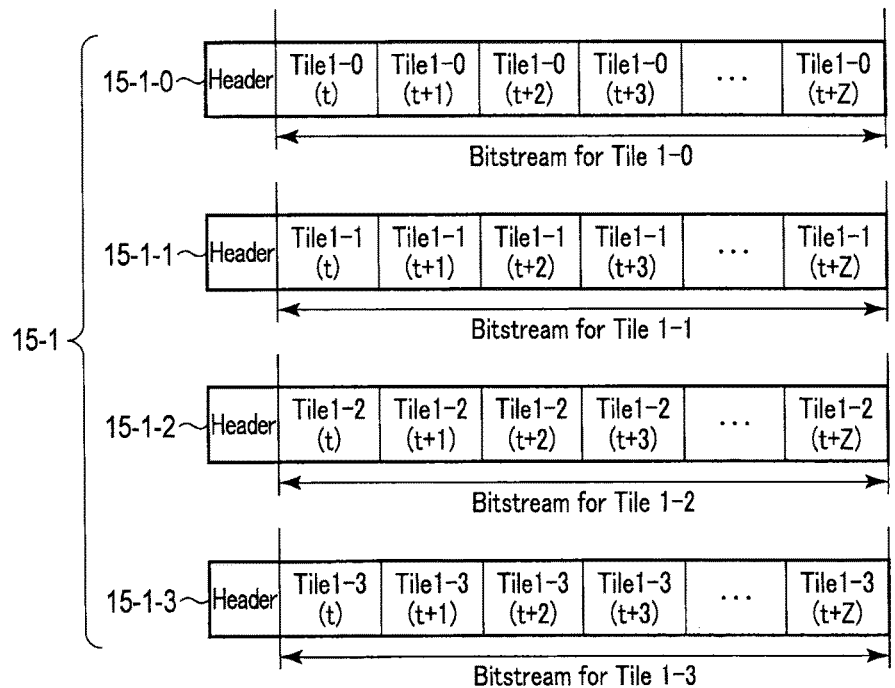
FIG. 7 is a diagram illustrating the partitioned first bitstream generated in the video compression apparatus in FIG. 2.

Specifically, the partitioner 203 partitions the first bitstream 13 illustrated in FIG. 6 into regions (tiles) and arranges each of the partitioned bitstreams into a regular format to generate the partitioned first bitstream 15-1 illustrated in FIG. 7. The first bitstream 13 includes a NAL unit corresponding to header information represented as "Header" and NAL units corresponding to compressed video data for the respective regions (in an example in FIG. 6, the respective tiles). The header information includes high-level syntax information on pictures such as SPS (Sequence Parameter Set), VPS (Video Parameter Set), PPS (Picture Parameter Set), and VUI (Video Usability Information).

As described above, each tile consists of one slice. Hence, in the example in FIG. 6, the first bitstream 13 includes four NAL units (that is, Tile1-0($t$), Tile1-1($t$), Tile1-2($t$), and Tile1-3($t$)) corresponding to compressed data of four tiles associated with a given time ($t$). For example, given that a random access point is set for every second for a video with a frame rate of 60 frames/sec, each bitstream includes compressed data of a total of 60 pictures associated with different points in time and includes, for each picture, NAL units corresponding to compressed data of four tiles.

In the example in FIG. 6, the NAL units corresponding to the compressed data of the tiles are arranged in an order of Tile1-0($t$), Tile1-1($t$), Tile1-2($t$), and Tile1-3($t$). However, the order is not particularly limited. The NAL unit corresponding to the compressed data of each tile can be uniquely identified based on the point in time and a tile number. Thus, regardless of the order in which the NAL units are arranged, the decoder can decode the desired NAL unit.

In the illustrated example, one header is added to a plurality of pictures. However, a header may be added to each picture or to each tile.

In the example in FIG. 7, the partitioned first bitstream 15-1 includes a first bitstream 15-1-0 for a tile 0, a first bitstream 15-1-1 for a tile 1, a first bitstream 15-1-2 for a tile 2, and a first bitstream 15-1-3 for a tile 3. The bitstream for each tile includes header information ("Header") and a NAL unit corresponding to the compressed data of the tile.

The partitioned bitstream 15 is saved in the storage 204. The partitioned bitstream 15 is read from the storage 204 by the communicator 205 as needed. The storage 204 is implemented by, for example, an HDD, an SSD, or any of various memories.

The communicator 205 exchanges communication data 16 with an external apparatus (for example, the video playback apparatus 300) via the channel 120 in accordance with a predetermined communication protocol. The communication data 16 may be a bitstream for delivery read from the storage 204 or a bitstream transmission request and region information from the external apparatus. Specifically, upon receiving the bitstream transmission request and region information from the external apparatus, the communicator 205 reads the bitstream stored in the storage 204 that corresponds to the region information. The communicator 205 transmits the read bitstream to the video playback apparatus 300 via the channel 120.

In an example in FIG. 2, the partitioned bitstream 15 is saved in the storage 204. However, instead of the partitioned bitstream 15, the first bitstream 13 and the second bitstream 14 may be saved in the storage 204. In this case, after the communicator 205 receives the bitstream transmission request and region information from the external apparatus, the first bitstream 13 and the second bitstream 14 are read from the storage 204, and the partitioner 203 generates the partitioned bitstream 15.

Figure 14:
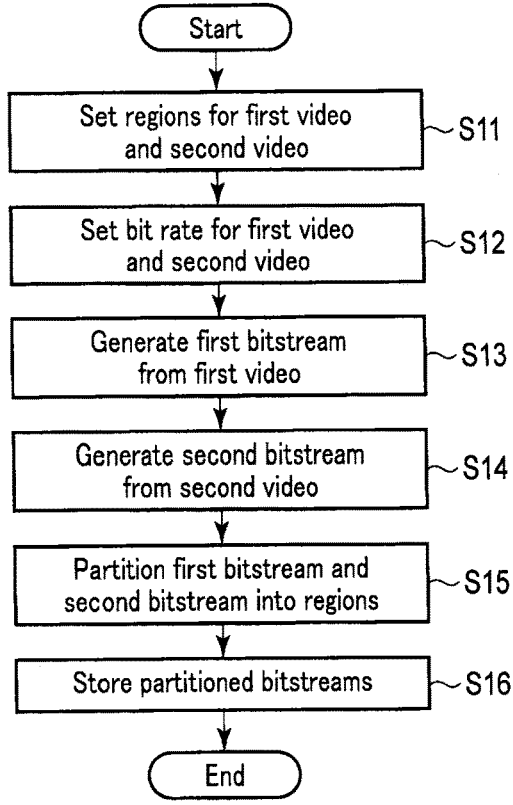
FIG. 14 is a flowchart illustrating a video compression process executed by the video compression apparatus in FIG. 2.

The video compression apparatus 200 in FIG. 2 executes the video compression process as illustrated in FIG. 14. The video compression process in FIG. 14 is started when the video compression apparatus 200 receives the first video 11 and the second video 12 from image sensing apparatus 110.

The first compressor 201 and the second compressor 202 sets a plurality of regions for the first video 11 and the second video 12, respectively (step S11). Moreover, the first compressor 201 and the second compressor 202 sets a target bit rate for the first video 11 and the second video 12, respectively (step S12).

The first compressor 201 generates the first bitstream 13 by compressing the first video 11 in accordance with the target bit rate set in step S12 so as to enable each of the plurality of regions set in step S11 to be independently decoded (step S13). On the other hand, the second compressor 202 generates the second bitstream 14 by compressing the second video 12 in accordance with the target bit rate set in step S12 so as to enable each of the plurality of regions set in step S11 to be independently decoded (step S14).

The partitioner 203 partitions the first bitstream 13 generated in step S13 into regions and partitions the second bitstream 14 generated in step S14 into regions, and arranges each of the partitioned bitstreams into a regular format to generate the partitioned bitstream 15 (step S15). The partitioned bitstream 15 generated in step S15 is saved in the storage 204 (step S16). Then, the video compression process in FIG. 14 ends.

Figure 15:
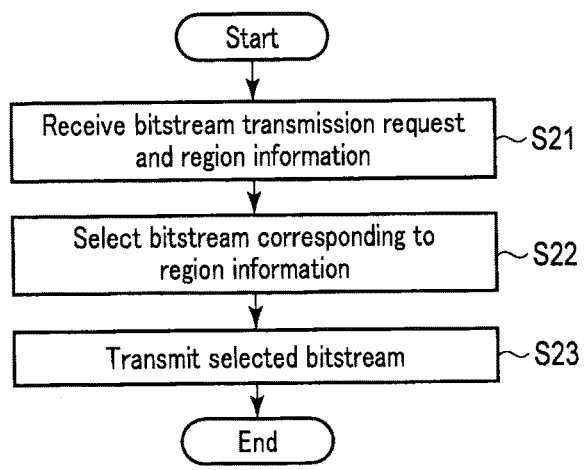
FIG. 15 is a flowchart illustrating a video delivery process executed by the video compression apparatus in FIG. 2.

The video compression apparatus 200 in FIG. 2 executes the video delivery process as illustrated in FIG. 15.

The communicator 205 receives the bitstream transmission request and region information via the channel 120 (step S21). The communicator 205 selects a bitstream for a specific region indicated by the region information, from the partitioned second bitstream 15-2, and selects a bitstream for a region different from the specific region from the partitioned first bitstream 15-1, in accordance with the region information received in step S21 (step S22).

The communicator 205 transmits the bitstreams selected in step S22 to the video playback apparatus 300 via the channel 120 (step S23). Then, the video delivery process in FIG. 15 ends.

Figure 8:
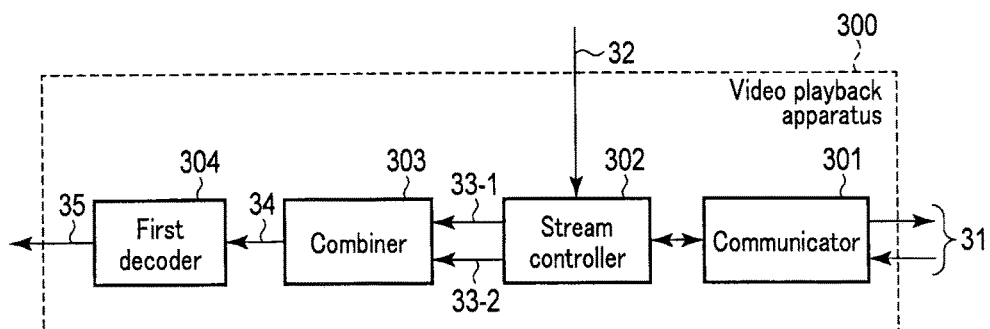
FIG. 8 is a block diagram illustrating a video playback apparatus according to the first embodiment.

As illustrated in FIG. 8, the video playback apparatus 300 functionally includes a communicator 301, a stream controller 302, a combiner 303, and a first decoder 304.

The communicator 301 exchanges communication data 31 with an external apparatus (for example, the video compression apparatus 200) via the channel 120 in accordance with a predetermined communication protocol. The communication data 31 may be, for example, a bitstream transmission request and region information from the stream controller 302 or bitstreams for delivery (for example, a first bitstream 33-1 and a second bitstream 33-2) from the external apparatus. Specifically, the communicator 301 transmits the bitstream transmission request and region information to the video compression apparatus 200 via the channel 120 in accordance with control from the stream controller 302. Upon receiving the first bitstream 33-1 and the second bitstream 33-2 via the channel 120, the communicator 301 outputs the first bitstream 33-1 and the second bitstream 33-2 to the stream controller 302.

The stream controller 302 performs bandwidth prediction based on relationship between the data volume and duration of the bitstream that has been acquired by the communicator 301 to derive an available bandwidth (that is, a data size per unit time (bit rate) that can be acquired via the channel 120). Based at least on the available bandwidth, the stream controller 302 generates region information including information that identifies a specific region in a bitstream for image quality improvement (for example, the partitioned second bitstream 15-2) which is requested for transmission (the included information is, for example, the tile number or slice number corresponding to the specific region). The stream controller 302 may generate the region information based on a user request 32 in addition to the available bandwidth. The stream controller 302 allows the communicator 301 to transmit the bitstream transmission request and region information. Upon receiving the first bitstream 33-1 and the second bitstream 33-2, the stream controller 302 outputs the first bitstream 33-1 and the second bitstream 33-2 to the combiner 303.

Specifically, the stream controller 302 performs bandwidth prediction associated with a pre-recorded adaptive streaming technique. In such technique, the controller may refer a decoding buffer occupancy located in the first decoder 304 and/or throughput of previously transmitted segment.

Figure 9:
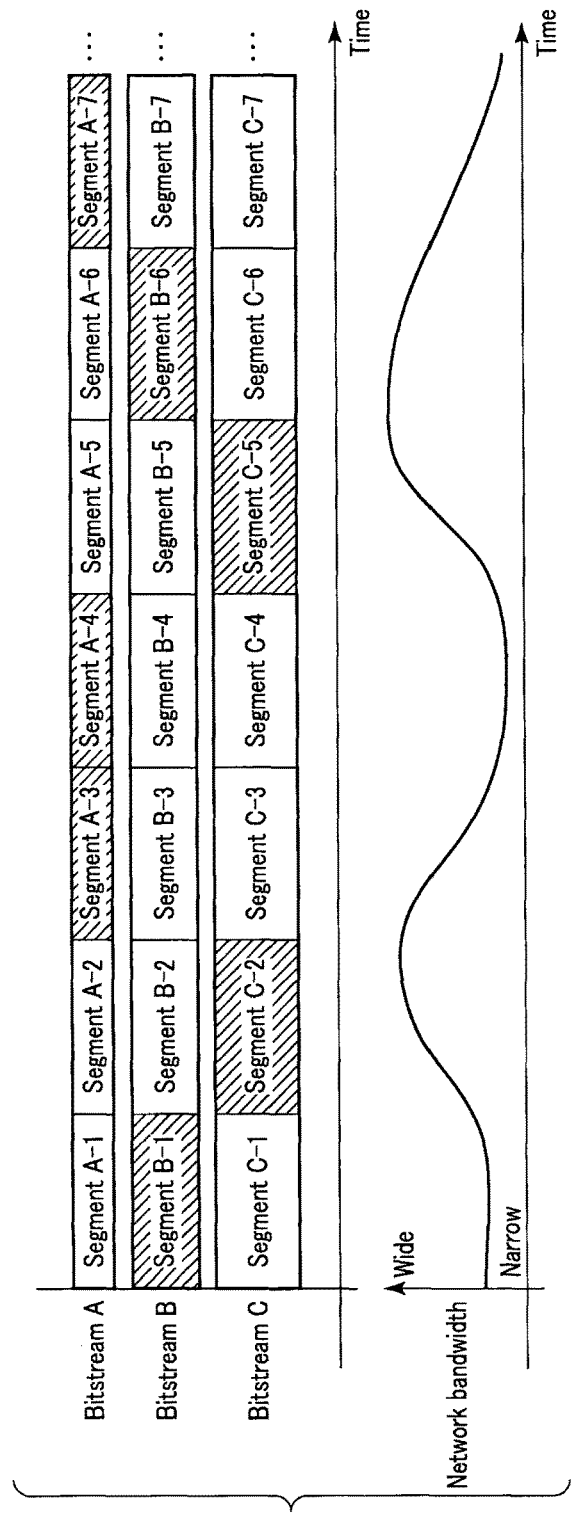
FIG. 9 is a diagram illustrating bandwidth prediction associated with a pre-recorded adaptive streaming technique.

According to a general pre-recorded adaptive streaming technique, the bitstreams for delivery are adaptively selected in segment units based on the available bandwidth derived by means of bandwidth prediction as illustrated in FIG. 9. In the example in FIG. 9, a bitstream A, a bitstream B, and a bitstream C which have different bit rates can be selected. The bit rate of the bitstream A is the lowest, and the bit rate of the bitstream C is the highest.

For example, when the available bandwidth for the next segment is predicted to be wider, a bitstream with a bit rate higher than the bit rate in the current segment may be selected for the next segment. On the other hand, when the available bandwidth for the next segment is predicted to be narrower, a bitstream with a bit rate lower than the bit rate in the current segment may be selected for the next segment. Adaptive selection of the bitstreams for delivery as described above enables a video to be continuously played without disrupting regardless of a variation in bandwidth.

When the total number of regions set for each of the first and second videos 11 and 12 is represented as M, the bit rate of the first bitstream 13 is represented as N [Mbps], the bit rate of the second bitstream 14 is represented as O [Mbps], the available bandwidth derived by means of bandwidth prediction is represented as P [Mbps], and the total number of regions in the partitioned first bitstream 15-1 which are requested for transmission is represented as T, the stream controller 302 needs to set T so as to satisfy Expression (1).

$$\frac{T}{M} \times N + \frac{M-T}{M} \times O < P \tag{1}$$

The left side of Expression (1) represents the total bit rate of the bitstream requested for transmission. In Expression (1), (M−T) represents the total number of regions in the partitioned second bitstream 15-2 which are requested for transmission. Since the second bitstream 14 has a higher bit rate than the first bitstream 13 as described above, the partitioned second bitstream 15-2 corresponds to a bitstream for image quality improvement. Thus, the use of the minimum value of T satisfying Expression (1) allows maximization of the image quality of the decoded video 35 under the available bandwidth.

For T>1, the stream controller 302 needs to select any region in the partitioned second bitstream 15-2 to be requested for transmission. The stream controller 302 allows the subjective image quality of the displayed video to be efficiently improved by preferentially selecting a region to which the user pays high attention as a specific region.

For example, the stream controller 302 may preset a preferentially selected region (hereinafter referred to as a preferential region) as a specific region automatically or based on the user request 32. When the total number of preferential regions is represented as S and Expression (2) illustrated below is not satisfied, the stream controller 302 can select all the preferential regions as specific regions. On the other hand, when Expression (2) is satisfied, the stream controller 302 needs to further narrow down the preferential regions.

$$S > M-T \tag{2}$$

Alternatively, the stream controller 302 may calculate a priority of each region automatically or based on the user request 32 to create a priority list in which the regions are associated with priorities. In this case, the stream controller 302 selects regions from a region with the highest priority to a region with the (M−T)th highest priority as specific regions. The priority list may be dynamically updated or fixed.

For example, the first video 11 and the second video 12 may correspond to monitoring videos taken with a fixed camera, and a monitoring target may be prefixed. In this case, the priority of each region may be calculated in accordance with the angle of view, and the calculated priorities may be fixedly utilized.

Furthermore, in general, as the viewer's attention is more likely to concentrate at the center of the screen than at the edges of the screen, the stream controller 302 may calculate the priorities such that regions with shorter distances from the center of the screen (or another predetermined position) have higher priorities. Similarly, in general, as the viewer's attention is more likely to concentrate on a moving object than on a stationary object, the stream controller 302 may calculate the priorities such that regions with moving objects and peripheral regions thereof have higher priorities.

Moreover, the stream controller 302 may calculate the priorities of the regions based on compression parameters obtained by decoding previously received bitstreams. The compression parameters are, for example, a code amount, a quantization parameter, motion information (for example, a motion vector), and a prediction mode information. An encoder (included in the video compression apparatus 200) is expected to have assigned larger code amounts to regions that are difficult to compress, regions with strenuous motion, regions with fine textures, regions with changes with respect to past videos, and regions determined by the encoder to be important for some reason. Hence, the stream controller 302 may calculate the priorities such that, for example, regions to which larger code amounts are previously assigned have higher priorities.

As described above, the stream controller 302 may generate region information based on the user request 32 in addition to the available bandwidth. The user can input the user request 32 via an external apparatus (for example, the display apparatus 130). The user request 32 may be received as a part of the communication data 31 by the communicator 301.

The user request 32 may be information that identifies a user request region requested by the user to be viewed with a high-quality image (for example, the tile number or slice number corresponding to the user request region or coordinate information specified by the user). The stream controller 302 may include the user request region indicated in the user request 32, in the above-described preferential regions or calculate the priorities such that the user request region has a higher priority. Alternatively, the stream controller 302 may calculate the priorities such that regions with shorter distances from the user request region have higher priorities.

The user request 32 may be a priority list created by an external apparatus (for example, the display apparatus 130) and in which the regions are associated with the priorities. Specifically, the display apparatus 130 can create a priority list serving as the user request 32 as described below.

The user operates the input I/F 134 to specify a region requested for viewing with a high-quality image. The user may operate the input I/F 134 while the decoded video 35 is being displayed on the display 132. To create the priority list serving as the user request 32, the input I/F 134 may be an input device that enables the user to specify any point in the screen.

Figure 28:
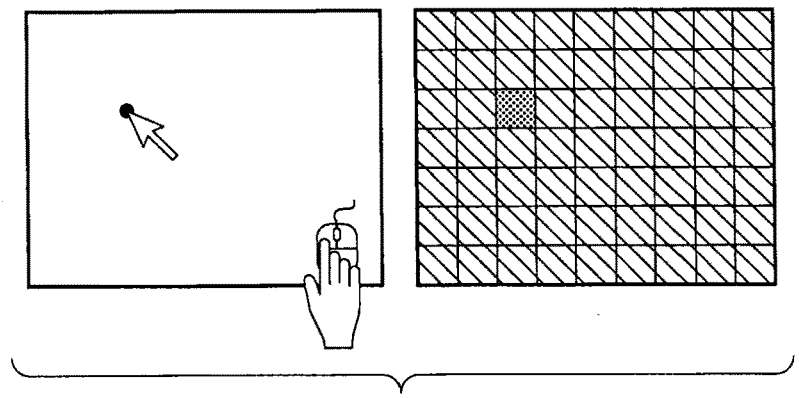
FIG. 28 is a diagram illustrating a process for identifying a user request region based on input coordinate information with respect to an input I/F.

For example, as depicted in FIG. 28, the user may specify a point requested for viewing with a high-quality image (for example, any one point such as an object to which the user pays attention) by clicking a mouse serving as the input I/F 134. In the example in FIG. 28, the display apparatus 130 detects input coordinate information (for example, coordinate information indicated by a mouse pointer at the time of clicking) and determines a region to which the input coordinate information belongs to identify a user request region.

The display apparatus 130 may calculate the priorities such that the identified user request region has a higher priority. However, if the object which the user pays attention is larger than each region, regions of higher priorities may be set to cover all the object as well as the requested region.

Thus, the display apparatus 130 calculates the priorities such that regions with shorter distances from the user request region have higher priorities. Such calculation of the priorities allows the display apparatus 130 to easily display the user request region and peripheral regions thereof with a high-quality image. Moreover, the display apparatus 130 may calculate the priority of each region further taking the above-described compression parameter into account. For example, a region associated with a compression parameter similar to the compression parameter of the user request region is likely to represent the same object as that in the user request region. On the other hand, a region associated with a compression parameter dissimilar to the compression parameter of the user request region may represent an object different from the object in the user request region. For example, when the user request region represents a moving object, a compression parameter for a region representing a stationary background may be significantly different from the compression parameter for the user request region. Hence, in view of these similarities between the compression parameters, the display apparatus 130 can prevent the priority of a peripheral region representing an object different from the object in the user request region from being calculated to be unnecessarily high.

Figure 29:
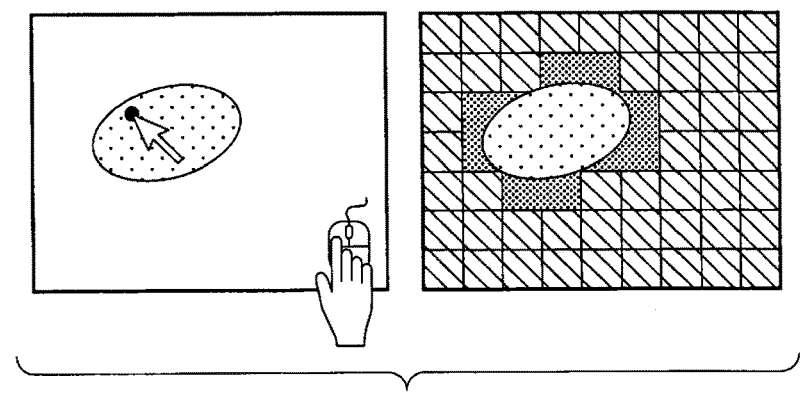
FIG. 29 is a diagram illustrating the process for identifying the user request region based on the input coordinate information with respect to the input I/F.

Alternatively, as depicted in FIG. 29, the user may specify the contour of a region requested for viewing with a high-quality image by operating the mouse serving as the input I/F 134. The contour may be a straight line, a curve, or a combination of a straight line and a curve. In the example in FIG. 29, the display apparatus 130 detects input coordinate information (for example, coordinate information on the contour) to determine a first region to which any piece of the input coordinate information belongs and a second region enclosed by the first region, thus identifying at least one user request region.

The display apparatus 130 may calculate the priorities such that the identified user request region has a higher priority. In the example in FIG. 29, the user request region can be specified such that the object to which the user pays attention is fitted in the region.

In the examples in FIG. 28 and FIG. 29, the user request region concentrates at one location in the screen. Hence, such specification of the user request region is useful, for example, in a case where one user pays attention to one object. On the other hand, the user request region may be distributed among a plurality of locations in the screen, for example, in a case where one user pays attention to a plurality of objects and a case where a plurality of users pay attention to individual objects.

Figure 30:
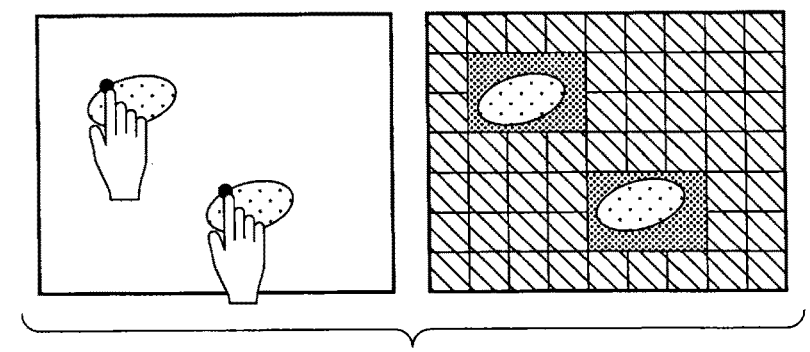
FIG. 30 is a diagram illustrating the process for identifying the user request region based on the input coordinate information with respect to the input I/F.

For example, as depicted in FIG. 30, the user may specify the contours of different regions requested for viewing with high-quality images by tracing a touch screen serving as the input I/F 134, with the user's finger. One user may specify a plurality of contour lines or a plurality of users may specify individual contour lines. When a plurality of users specify the individual contours, the users may operate the individual touch screens (that is, the input I/Fs 134). The contour may be a straight line, a curve, or a combination of a straight line and a curve. In the example in FIG. 30, the display apparatus 130 detects input coordinate information (for example, coordinate information on each contour line) to determine a first region to which any piece of the input coordinate information belongs and a second region enclosed by the first region, thus identifying at least one user request region.

The display apparatus 130 may calculate the priorities such that the identified user request region has a higher priority. When a plurality of users specify the individual contours, the priority may be weighted for each user. For example, the display apparatus 130 may calculate priorities such that the priority assigned to a user request region based on a contour line specified by a first user is higher than the priority assigned to a user request region based on a contour line specified by a second first user. In the example in FIG. 30, the user request region can be distributed among a plurality of locations in the screen.

The display apparatus 130 preferably presets a default value (for example, an initial priority list) prior to the user request 32. The display apparatus 130 may output the default value to the video playback apparatus 300 as the user request 32 until the user operates the input I/F 134. By utilizing the user request 32, the stream controller 302 preferentially selects a region to which the user is likely to pay attention even when the user does not operate the input I/F 134 (for example, a region close to the center of the screen), allowing the subjective image quality of the displayed video to be efficiently improved.

Figure 18:
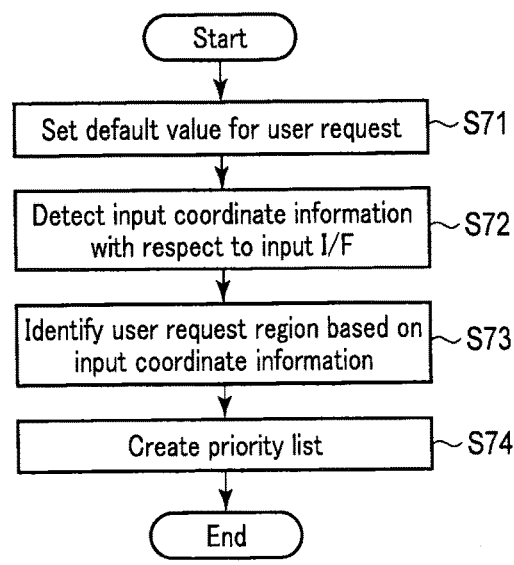
FIG. 18 is a flowchart illustrating a user request creating process executed by a display apparatus in FIG. 1.

The display apparatus 130 in FIG. 1 executes the user request creating process as illustrated in FIG. 18. The user request creating process in FIG. 18 may be executed by an external apparatus other than the display apparatus 130 or by the video playback apparatus 300.

The display apparatus 130 first sets the default value prior to the user request 32 (step S71). For example, the display apparatus 130 may calculate the priorities such that regions with shorter distances from the center of the screen have higher priorities to create an initial priority list in which the regions are associated with the priorities. The default value set in step S71 is utilized by the video playback apparatus 300 as the user request 32 until the user operates the input I/F 134.

When the user operates the input I/F 134 after step S71, the display apparatus 130 detects input coordinate information with respect to the input I/F 134 (step S72). The display apparatus 130 identifies the user request region based on the input coordinate information detected in step S72 (step S73). The display apparatus 130 calculates the priority of each region based on the user request region identified in step S73 to create a priority list in which the regions are associated with the priorities (step S74). The display apparatus 130 outputs the priority list to the video playback apparatus 300 as the user request 32. The user request creating process in FIG. 18 ends.

The combiner 303 receives the first bitstream 33-1 and the second bitstream 33-2 from the stream controller 302. The combiner 303 combines the first bitstream 33-1 and the second bitstream 33-2 corresponding to bitstreams for region units and arranges the resultant bitstream into a regular format (for example, adds appropriate header information to the bitstream) to generate the combined bitstream 34 corresponding to a bitstream in picture units. That is, the combiner 303 executes a process reverse to the process executed by the partitioner 203. The combiner 303 outputs the combined bitstream 34 to the first decoder 304.

Figure 10:
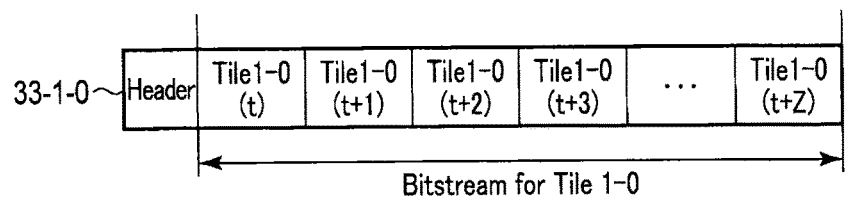
FIG. 10 is a diagram illustrating a first bitstream received by the video playback apparatus in FIG. 8.
Figure 11:
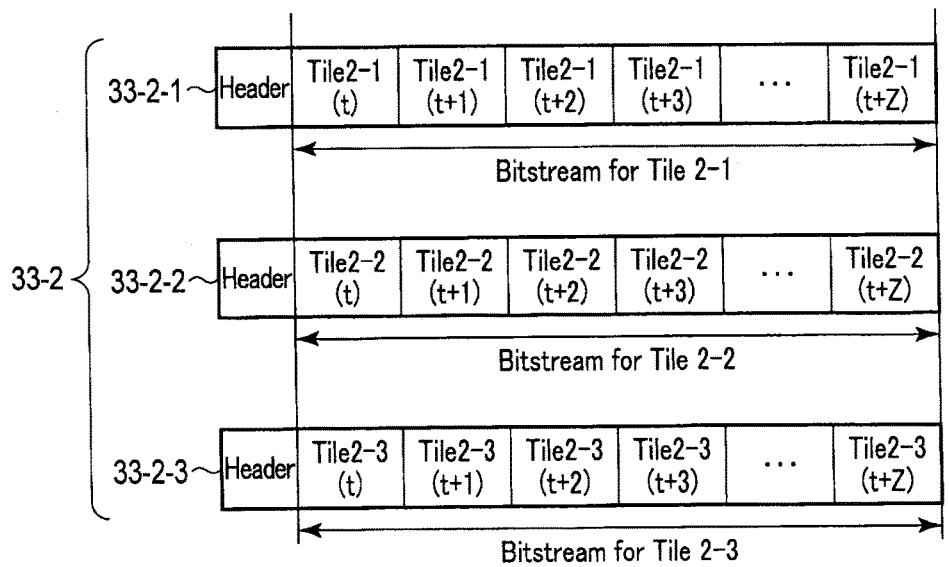
FIG. 11 is a diagram illustrating a second bitstream received by the video playback apparatus in FIG. 8.

Specifically, the combiner 303 combines the first bitstream 33-1 illustrated in FIG. 10 and the second bitstream 33-2 illustrated in FIG. 11 to generate the combined bitstream 34 illustrated in FIG. 12. In the examples in FIG. 10, FIG. 11, and FIG. 12, the stream controller 302 requests transmission of a bitstream for the tile 0 in the partitioned first bitstream 15-1 and transmission of a bitstream for the tile 1, the tile 2, and the tile 3 in the partitioned second bitstream 15-2. In the examples in FIG. 10, FIG. 11, and FIG. 12, the region requested for transmission does not overlap between the partitioned first bitstream 15-1 and the partitioned second bitstream 15-2. Thus, the bandwidth is effectively utilized.

The first bitstream 33-1 in FIG. 10 includes the first bitstream 33-1-0 for the tile 0 but does not include a first bitstream for the tile 1, the tile 2, and the tile 3. On the other hand, the second bitstream 33-2 in FIG. 11 includes a second bitstream 33-2-1 for the tile 1, a second bitstream 33-2-2 for the tile 2, and a second bitstream 33-2-3 for the tile 3 but does not include a second bitstream for the tile 0. The combined bitstream 34 in FIG. 12 includes the compressed data of the tile 0 originating from the partitioned first bitstream 15-1 and the compressed data of the tile 1, the tile 2, and the tile 3 originating from the partitioned second bitstream 15-2.

The first decoder 304 receives the combined bitstream 34 from the combiner 303. The first decoder 304 decodes the combined bitstream 34 to generate the decoded video 35. The first decoder 304 shares the same codec with the first compressor 201 and the second compressor 202. The first decoder 304 outputs the decoded video 35 to an external apparatus (for example, the display apparatus 130). The decoded video 35 is saved in a buffer of the external apparatus so as to be displayed at the appropriate time for the user to view.

The video playback apparatus 300 in FIG. 8 executes the video request process as illustrated in FIG. 16. When the video request process is started, the stream controller 302 performs bandwidth prediction on the network to derive the available bandwidth (step S31).

The stream controller 302 sets the number of regions in each of the partitioned first and partitioned second bitstreams 15-1 and 15-2 which are requested for transmission so that the bandwidth usage does not exceed the available bandwidth derived in step S31 (step S32).

In accordance with the number of regions set in step S32, the stream controller 302 uses the priority list to select a specific region requested for transmission from the partitioned second bitstream 15-2 and sets region information that identifies the specific region (step S33).

The stream controller 302 allows the communicator 301 to transmit the bitstream transmission request and the region information set in step S33 (step S34). The video request process in FIG. 16 then ends.

The video playback apparatus 300 in FIG. 8 executes the video playback process as illustrated in FIG. 17.

The communicator 301 receives the first bitstream 33-1 and the second bitstream 33-2 via the channel 120 (step S41).

The combiner 303 combines the first bitstream 33-1 and the second bitstream 33-2 received in step S41 and arranges the resultant bitstream into a regular format to generate the combined bitstream 34 (step S42).

The first decoder 304 decodes the combined bitstream 34 generated in step S42 into the decoded video 35 (step S43). Moreover, the first decoder 304 outputs the decoded video 35 generated in step S43 to an external apparatus (for example, the display apparatus 130) (step S44). The video playback process in FIG. 17 then ends.

Figure 13:
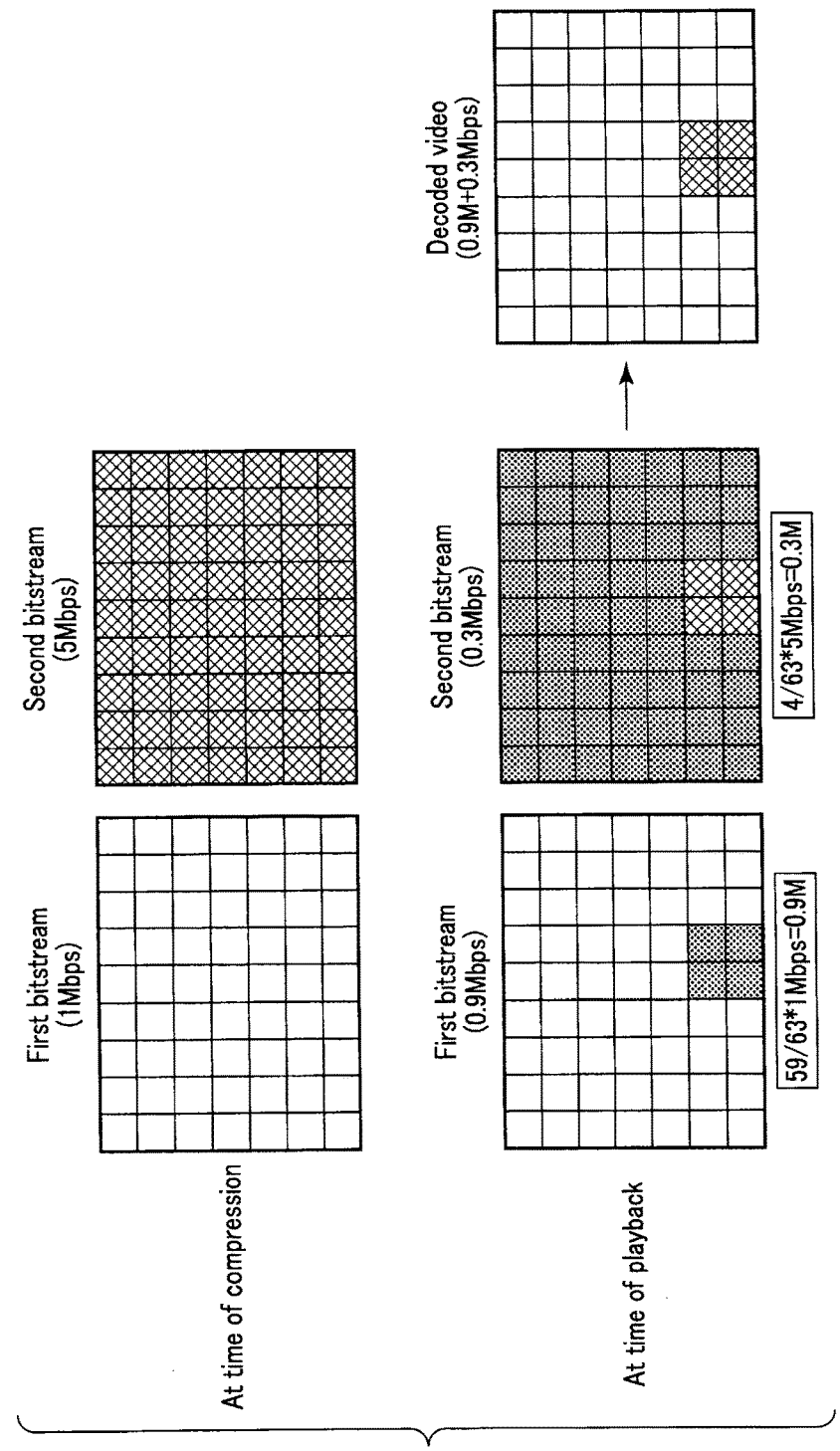
FIG. 13 is a diagram illustrating operations of the video delivery system according to the first embodiment.

A video delivery system according to a first embodiment operates as illustrated in FIG. 13. In the example in FIG. 13, the first video 11 and the second video 12 are each partitioned into 63 tiles, the first bitstream 13 has a bit rate of 1 Mbps, and the second bitstream 14 has a bit rate of 5 Mbps. As described above, the partitioned first bitstream 15-1 and the partitioned second bitstream 15-2, which result from partitioning of the first bitstream 13 and the second bitstream 14, respectively, into tiles, are saved in the storage 204.

The stream controller 302 determines the minimum value of T satisfying Expression (1) described above to be 59. The stream controller 302 then, for example, selects four specific regions based on the priority list to generate region information that identifies the selected specific regions. In accordance with the priorities of the regions, the stream controller 302 selects the specific regions to allow the subjective image quality of the displayed video to be efficiently improved, as described above. The stream controller 302 allows the communicator 301 to transmit the bitstream transmission request and region information.

As a result, the communicator 301 receives a bitstream for the four tiles corresponding to the specific regions in the partitioned second bitstream 15-2, and receives a bitstream for 59 tiles different from the specific regions in the partitioned first bitstream 15-1. That is, the first bitstream 33-1 and the second bitstream 33-2 do not include a bitstream for dotted tiles in FIG. 13. The combiner 303 combines the first bitstream 33-1 and the second bitstream 33-2 to generate the combined bitstream 34. The first decoder 304 decodes the combined bitstream 34 to generate the decoded video 35. The bit rate of the decoded video 35 can be roughly estimated to be about 1.2 ($=59 \times 1/63 + 4 \times 5/63$) Mbps. It should be noted that the stream controller 302 can adjust the number of specific regions in accordance with an increase or a decrease in available bandwidth to flexibly change the bit rate of the decoded video 35.

The stream controller 302 may use the accumulated value of past bit rates for each region to perform bit rate prediction for each region, thus achieving an adaptive streaming technique for an insignificant variation in bit rate.

As described above, in the video delivery system according to the first embodiment, the video compression apparatus sets a plurality of regions for the first video and the second video and compresses the first video and the second video for each of the plurality of regions so as to enable each region to be independently decoded, thus generating the first bitstream and the second bitstream. The video compression apparatus partitions each of the first and second bitstreams into the regions, thus allowing selection from and request for each the first and second bitstreams to be achieved in region units. Hence, in the system, the video playback apparatus enables the data size of bitstreams requested for transmission to be flexibly changed in accordance with the available bandwidth. The video playback apparatus can thus stably reproduce videos while suppressing degradation of image quality without the need to prepare an enormous number of bitstreams in the video compression apparatus.

Moreover, the video playback apparatus enables the region requested for transmission (specific region) to be optionally selected from the bitstream for image quality improvement under the available bandwidth. Thus, in this system, the subjective image quality of the displayed video can be efficiently improved by preferentially selecting the region to which the user pays attention from the bitstream for image quality improvement as a specific region.

Second Embodiment

A video delivery system according to a second embodiment corresponds to the video delivery system 100 in FIG. 1 in which the video compression apparatus 200 and the video playback apparatus 300 are modified into a video compression apparatus 400 and a video playback apparatus 500, respectively.

The video compression apparatus 400 and the video playback apparatus 500 perform SVC (Scalable Video Coding). SVC (also referred to as hierarchical coding) involves using a base layer and one or more enhancement layers to encode a video in a layered manner. Each of the enhancement layers references the base layer or a lower enhancement layer to enable efficient predictive coding. It is hereinafter assumed that the video compression apparatus 400 and the video playback apparatus 500 use the H.264 SVC scheme, which has been standardized. The video compression apparatus 400 and the video playback apparatus 500 may use the HEVC SVC scheme, the Multi-view Video Coding scheme, and the like, which also have been standardized.

Figure 19:
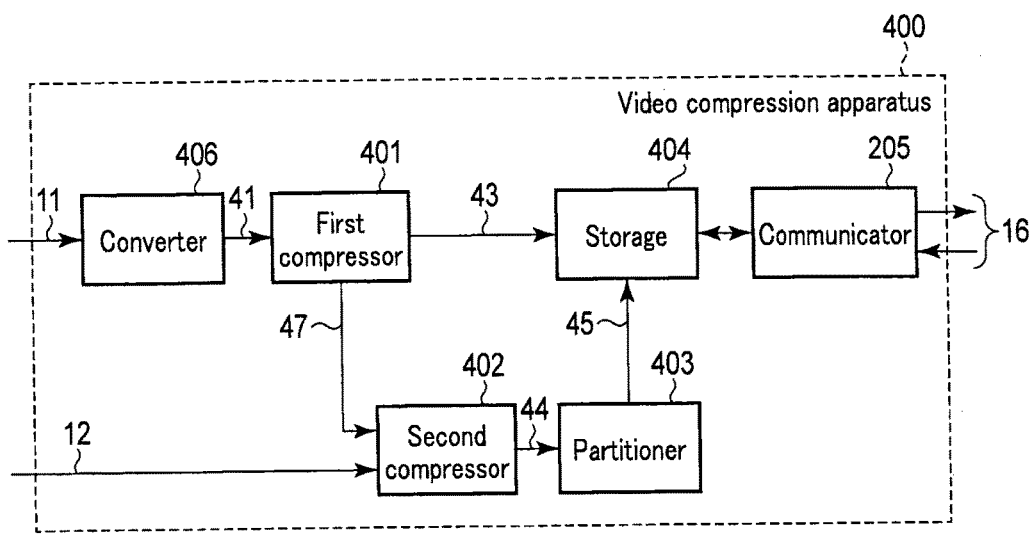
FIG. 19 is a block diagram illustrating a video compression apparatus according to a second embodiment.

As illustrated in FIG. 19, the video compression apparatus 400 includes a first compressor 401, a second compressor 402, a partitioner 403, storage 404, a communicator 205, and a converter 406.

The converter 406 receives a first video 11 from an image sensing apparatus 110. The converter 406 applies a predetermined conversion to the first video 11 to generate a first converted video 41. The converter 406 outputs the first converted video 41 to the second compressor 402.

The predetermined conversion may correspond to, for example, some or all of the following: (1) an increase or a reduction in resolution, (2) an increase or a reduction in frame rate, (3) an I (Interlace)/P (Progressive) conversion (also referred to as a deinterlace process) that allows a progressive video to be generated from an interface video or a P/I conversion reverse to the I/P conversion, (4) an increase or a reduction in pixel bit depth (which may also be referred to as a dynamic range, or the like), (5) a change in color space, (6) a change in the angle of view, and (7) a geometric conversion. The predetermined conversion may be determined depending on the type of scalability provided by the video compression apparatus 400 and the video playback apparatus 500. The video compression apparatus 400 and the video playback apparatus 500 can provide, for example, resolution scalability, temporal scalability (or frame rate scalability), dynamic scalability, color space scalability, or codec scalability.

The converter 406 may be omitted depending on the type of the scalability provided by the video compression apparatus 400 and the video playback apparatus 500. The converter 406 may be omitted, for example, when the video compression apparatus 400 and the video playback apparatus 500 provide image quality scalability, bit rate scalability, PSNR (Peak Signal-to-Noise Ratio) scalability, or the like.

Codec scalability refers to the ability to allow the first compressor 401 and the second compressor 402 to utilize different codecs, that is, different compression standards or methods. For example, the use of an HEVC scalable extension function enables provision of a configuration in which the first compressor uses the H.264 codec, whereas the second compressor 402 uses the HEVC scalable extension function.

The first compressor 401 receives the first converted video 41 from the converter 406. The first compressor 401 compresses the first converted video 41 to obtain a first bitstream 43. The first bitstream 43 corresponds to a base layer. The first compressor 401 outputs the first bitstream 43 to the storage 404. Moreover, the first compressor 401 executes a local decoding process (which may be also referred to as a reference image generation process) to generate a first decoded video 47 and outputs the first decoded video 47 to the second compressor 402. The first decoded video 47 is equal to the first converted video 41 given that encoding distortion and the like are neglected.

The second compressor 402 receives a second video 12 from the image sensing apparatus 110 and receives the first decoded video 47 from first compressor 401. The second compressor 402 sets a plurality of regions for the second video 12. The second compressor 402 then compresses the second video for each of the plurality of set regions based on the first decoded video 47 so as to enable each region to be independently decoded, thus obtaining a second bitstream 44. The second bitstream 44 corresponds to an enhancement layer. The second compressor 402 outputs the second bitstream 44 to the partitioner 403.

As described above, the second compressor 402 may utilize a codec different from the codec for the first compressor 401.

The second compressor 402 may apply a conversion reverse to the above-described predetermined conversion to the first decoded video 47 as needed. Such a reverse conversion may be performed by a reverse converter not depicted in the drawings and interposed between the first compressor 401 and the second compressor 402 instead of the second compressor 402.

Specifically, given that the first video 11 and the second video 12 are the same (for example, a 4K video with a pixel size of 3,840×2,160) and the predetermined conversion corresponds to a reduction in resolution, the video compression apparatus 400 and the video playback apparatus 500 can provide the resolution scalability and the PSNR scalability. In this case, second compressor 402 increases the resolution of the first decoded video 47 (which corresponds to, for example, an HD video with a pixel size of 1,920×1,080) to generate a reference image. The second compressor 402 then uses the reference image to perform predictive encoding on the second video 12. The reduced resolution facilitates a reduction in the bit rate of the first bitstream 43 and is effective for narrowband transmission.

Given that the first video 11 and the second video 12 are the same and the predetermined conversion corresponds to a reduction in frame rate, the video compression apparatus 400 and the video playback apparatus 500 can provide the temporal scalability. The converter 406 may apply frame drop to the first video 11 or apply a low pass filter in a temporal direction to reduce the frame rate. In this case, the second compressor 402 increases the frame rate of the first decoded video 47 (for example, applies frame interpolation to the first decoded video 47) to generate a reference image. The second compressor 402 then uses the reference image to perform predictive encoding on the second video 12.

It is assumed that the first video 11 and the second video 12 are the same progressive video and that the predetermined conversion corresponds to a PI conversion. The converter 406 may perform the PI conversion by using different phases for odd-numbered frames and for even-numbered frames to down-convert the vertical resolution of the first video 11 (for example, apply the low pass filter in the temporal direction). In this case, the second compressor 402 applies the IP conversion to the first decoded video 47 to generate a reference image. The second compressor 402 then uses the reference image to perform predictive encoding on the second video 12.

Given that the first video 11 and the second video 12 are the same and the predetermined conversion is a reduction in pixel bit depth, the video compression apparatus 400 and the video playback apparatus 500 can provide dynamic range scalability. The converter 406 may shift the pixel bits of the first video 11, for example, rightward by 2 bits to reduce the pixel bit depth of the first video 11 by 2 bits. In this case, the second compressor 402 increases the pixel bit depth of the first decoded video 47 (for example, shifts the pixel bit depth of the first decoded video 47 leftward by 2 bits with a rounding process taken into account) to generate a reference image. The second compressor 402 then uses the reference image to perform predictive encoding on the second video 12.

Given that the first video 11 and the second video 12 are the same and the predetermined conversion corresponds to a change in color space, the video compression apparatus 400 and the video playback apparatus 500 can provide the color space scalability. For example, the first video 11 is assumed to correspond to an image signal on a color space recommended by ITU-R BT.2020 (hereinafter simply referred to as the "BT.2020 color space"). The first decoded video 47 is assumed to correspond to an image signal on a color space recommended by ITU-R BT.709 (hereinafter simply referred to as the "BT.709 color space"). In this case, the second compressor 402 changes a color space for the first decoded video 47 to the ITU-R BT.2020 color space to generate a reference image. The second compressor 402 then uses the reference image to perform predictive encoding on the second video 12.

It is possible that the first video 11 and the second video 12 are the same and that the predetermined conversion involves trimming of a predetermined region (that is, a change in the angle of view). The predetermined region is preferably a region to which a user pays (or is likely to pay) attention (for example, a monitoring region or the above-described specific region, user request region, or preferential region). In this case, the second compressor 402 may use the first decoded video 47 as a reference image or correct the angle of view of the first decoded video 47 to generate a reference image. The second compressor 402 uses the reference image to perform predictive encoding on the second video 12.

The angle-of-view correction may be a process of padding regions lost as a result of the trimming of the predetermined region, with pixel values. The pixel values used for the padding process may be determined based on pixel values in the lost regions in the first video 11. Alternatively, information indicative of the pixel values used for the padding process may be embedded in the second bitstream 44. Embedding such information in the second bitstream 44 allows the video playback apparatus 500 to execute an angle-of-view correction similar to the angle-of-view correction executed by the second compressor 402. When the converter 406 changes the angle of view, encoding efficiency in the second compressor 402 is likely to decrease. However, if the available bandwidth is narrow, a display target is limited from the entire picture to the above-described predetermined region, thus enabling degradation of image quality to be suppressed. If the available bandwidth is wide, videos with a wide angle of view and a high resolution can be displayed.

The video compression apparatus 400 and the video playback apparatus 500 can provide, for example, a combination of a plurality of scalabilities. For example, the video compression apparatus 400 and the video playback apparatus 500 may provide a combination of the resolution scalability and the color space scalability. For example, it is assumed that the first decoded video 47 corresponds to a full high-definition broadcasting video (that is, an HDTV-sized interlaced image with a BT.709 color space) and that the second video 12 corresponds to a 4K broadcasting video (that is, a 4K-sized progressive video with a BT.2020 color space). In this case, the second compressor 402 applies a change in color space, an increase in resolution, and the IP conversion to the first decoded video 47 to generate a reference image. The second compressor 402 uses the reference image to perform predictive encoding on the second video 12.

Alternatively, the video compression apparatus 400 and the video playback apparatus 500 may provide a combination of the temporal scalability, the resolution scalability, and the PSNR scalability. It is assumed that the first video 11 and the second video 12 are the same (for example, a 4K video which is 3,840×2,160 in pixel size and which is 60 fps) and that the predetermined conversion corresponds to a reduction in resolution and in frame rate. In this case, the second compressor 402 increases the resolution of the first decoded video 47 (corresponding to an HD video which is 1,920×1,080 in pixel size and which is 30 fps) and the frame rate to generate a reference image. The second compressor 402 then uses the reference image to perform predictive encoding on the second video 12. The reduced resolution and the reduced frame rate facilitate a reduction in the bit rate of the first bitstream 43 and are effective for narrowband transmission.

The video compression apparatus 400 and the video playback apparatus 500 may provided scalability not illustrated in the present embodiment. The above-described predetermined conversion may be changed as needed depending on the scalability. Furthermore, even when the video compression apparatus 400 and the video playback apparatus 500 provide the scalability illustrated in the present embodiment, the above-described predetermined conversion is only illustrative. For example, when the video compression apparatus 400 and the video playback apparatus 500 provide the dynamic range scalability, the converter 406 may use a gamma conversion instead of the bit shift to increase or reduce the pixel bit depth.

The converter 406 may apply the predetermined conversion to the second video 12 instead of the first video 11 to generate a second converted video. For example, the converter 406 may generate the second converted video by reducing the resolution of the second video 12 or trimming a predetermined region from the second video 12. When the converter 406 effects such a change on the second video 12, the entire picture can be displayed if the available bandwidth is narrow, and the predetermined region can be displayed with a high-quality image if the available bandwidth is wide.

The partitioner 403 receives the second bitstream 44 from the second compressor 402. The partitioner 403 partitions the second bitstream 44 into regions and arranges each of the partitioned bitstreams into a regular format (for example, adds appropriate header information to the region) to generate a partitioned second bitstream 45. The partitioned second bitstream 45 includes bitstreams for the regions. The partitioner 403 outputs the partitioned second bitstream 45 to the storage 404.

The partitioner 403 does not partition the first bitstream 43 as depicted in FIG. 19. The first bitstream 43 corresponds to a base layer as described above. In the SVC scheme, a decoder fails to decode enhancement layers unless the decoder acquires the base layer. Hence, the video playback apparatus 500 basically requests transmission of the first bitstream 43 for the entire picture. Thus, the partitioner 403 need not partition the first bitstream 43.

However, the partitioner 403 may partition the first bitstream 43 into regions similarly to the partitioner 203. Given that the video playback apparatus 500 does not request transmission of some regions, the regions are precluded from being decoded, leading to lost regions in the decoded video. In this case, the video playback apparatus 500 may execute a supplement process for the lost regions.

The first bitstream 43 and a partitioned second bitstream 45 are saved in the storage 404. The first bitstream 43 and the partitioned second bitstream 45 are read from the storage 404 by a communicator 205 as needed. The storage 404 is implemented by, for example, an HDD, an SSD, or any of various memories.

In the example in FIG. 19, the partitioned second bitstream 45 is saved in the storage 204. However, instead of the partitioned second bitstream 45, the second bitstream 44 may be saved in the storage 404. In this case, after the communicator 205 receives a bitstream transmission request and region information from an external apparatus, the second bitstream 44 is read from the storage 204, and the partitioner 403 generates the partitioned second bitstream 45.

Figure 24:
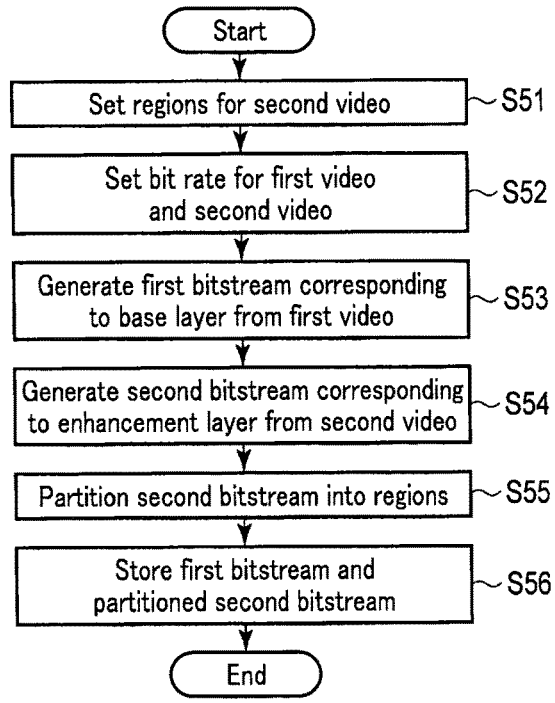
FIG. 24 is a flowchart illustrating a video compression process executed by the video compression apparatus in FIG. 19.

The video compression apparatus 400 in FIG. 19 executes a video compression process as illustrated in FIG. 24. In the example in FIG. 24, description of the converter 406 is omitted for simplification. The video compression process in FIG. 24 is started when the video compression apparatus 400 receives the first video 11 and the second video 12 from the image sensing apparatus 110.

The second compressor 402 sets a plurality of regions for the second video 12 (step S51). Moreover, the first compressor 401 and the second compressor 402 sets a target bit rate for the first video 11 (or the first converted video 41) and the second video 12, respectively (step S52). The first bitstream 43 corresponds to a base layer basically requested for the entire picture, and thus, the target bit rate for the first video 11 is desirably limited to within an appropriate range.

The first compressor 401 compresses the first video 11 (or the first converted video 41) in accordance with the target bit rate set in step S52 to generate the first bitstream 43 and first decoded video 47 corresponding to the base layer (step S53).

On the other hand, in accordance with the target bit rate set in step S52, the second compressor 402 compresses the second video 12 based on the first decoded video 47 generated in step S53 so as to enable each of the plurality of regions set in step S51 to be independently decoded. The second compressor 402 thus generates the second bitstream 44 corresponding to an enhancement layer (step S54).

The partitioner 403 partitions the second bitstream 44 generated in step S54 into regions and arranges each of the partitioned bitstreams into a regular format to generate a partitioned second bitstream 45 (step S55).

The first bitstream 43 generated in step S53 and the partitioned second bitstream 45 generated in step S55 are saved in the storage 204 (step S56). The video compression process in FIG. 24 then ends.

As depicted in FIG. 20, the video playback apparatus 500 includes a communicator 301, a stream controller 502, a combiner 503, a first decoder 504, and a second decoder 505.

Like the stream controller 302, the stream controller 502 performs bandwidth prediction on the channel 120 based on information such as bitstreams received by the communicator 301 to derive an available bandwidth. Based at least on the available bandwidth, the stream controller 502 generates region information including information that identifies a specific region in a bitstream for image quality improvement (for example, the partitioned second bitstream 45) which is requested for transmission. The stream controller 502 may generate the region information based on a user request 32 in addition to the available bandwidth. The stream controller 502 allows a communicator 301 to transmit the bitstream transmission request and region information. Upon receiving a first bitstream 53-1 and a second bitstream 53-2, the stream controller 502 outputs the first bitstream 53-1 to the first decoder 504 and outputs the second bitstream 53-2 to the combiner 503.

When the total number of regions set in the second video 12 is represented as M, the bit rate of the first bitstream 43 is represented as N [Mbps], the bit rate of the second bitstream 44 is represented as O [Mbps], the available bandwidth derived by means of bandwidth prediction is represented as P [Mbps], and the total number of regions in the partitioned second bitstream 45 which are requested for transmission (that is, specific regions) is represented as W, the stream controller 502 needs to set W so as to satisfy Expression (3).

$$N + \frac{W}{M} \times O < P \qquad (3)$$

The left side of Expression (3) represents the total bit rate of a bitstream requested for transmission. Since the second bitstream 44 corresponds to an enhancement layer as described above, the partitioned second bitstream 45 corresponds to a bitstream for image quality improvement. Hence, the use of the maximum value of W satisfying Expression (3) allows maximization of the image quality of a second decoded video 55-2 under the available bandwidth. The entire picture can be decoded as long as the first bitstream 43 corresponding to the base layer can be acquired, and thus, it is possible that W=0 when the available bandwidth is narrow.

For W>1, which of the regions in the partitioned second bitstream 45 is requested for transmission needs to be determined. In this regard, the subjective image quality of a displayed image can be efficiently improved by preferentially selecting a region to which the user pays attention as a specific region. For example, the stream controller 502 may preset the preferential region automatically or based on the user request 32. When the total number of preferential regions is represented as S and Expression (4) illustrated below is not satisfied, the stream controller 502 can select all the preferential regions as specific regions. On the other hand, when Expression (4) is satisfied, the stream controller 502 needs to further narrow down the preferential regions.

$$S > W \qquad (4)$$

Alternatively, the stream controller 502 may calculate the priority of each region automatically or based on the user request 32 to create a priority list in which the regions are associated with the priorities. In this case, the stream controller 502 selects regions ranging from a region with the highest priority to a region with the Wth highest priority as specific regions. The priority list may be created using a technique similar to the technique in the first embodiment.

The combiner 503 receives the second bitstream 53-2 from the stream controller 502. The combiner 503 performs combination on the second bitstream 33-2 corresponding to a bitstream in region units and arranges the resultant bitstream into a regular format (for example, adds appropriate header information to the bitstream) to generate a combined bitstream 54 corresponding to a bitstream in picture units. That is, the combiner 503 executes a process reverse to the process executed by the partitioner 403. The combiner 503 outputs the combined bitstream 54 to the second decoder 505.

When the second bitstream 53-2 does not include a bitstream for some regions, the combiner 503 may generate the combined bitstream 54 with these regions lost. However, if the bitstream for the enhancement layer has a lost portion, an SVC decoder designed with no consideration for packet loss may suspend a decoding process until the SVC decoder receives the next (random) access point. Given that the second decoder 505 corresponds to such an SVC decoder, the second decoder 505 may suspend the decoding process and stop playback of the video even upon receiving the combined bitstream 54 with some regions lost. To prevent such a situation, the combiner 503 operates as follows. That is, if the second bitstream 53-2 does not include a bitstream for some regions, the combiner 503 may supplement the combined bitstream 54 with a predetermined bitstream instead of compressed data of the regions.

For example, if the second bitstream 53-2 does not include a bitstream for some regions, the combiner 503 may treat the regions as skip regions. The skip regions mean regions for which a skip mode specified in H.264 or HEVC is set. The skip region is decoded by copying a predicted image for another region to the skip region. Specifically, the second decoder 505 may copy the corresponding region included in a first decoded video 55-1 to the skip region.

The video compression apparatus 400 may transmit a predetermined bitstream to the video playback apparatus 500. For example, upon receiving a bitstream transmission request and region information, the communicator 205 may select and transmit a bitstream corresponding to a specific region from the partitioned second bitstream 45 based on the region information. The communicator 205 may further transmit the predetermined bitstream for a region different from the specific region. When the video compression apparatus 400 transmits the predetermined bitstream, the bit rate of the second bitstream 53-2 increases but the supplement process of the combiner 503 may be omitted.

Figure 21:
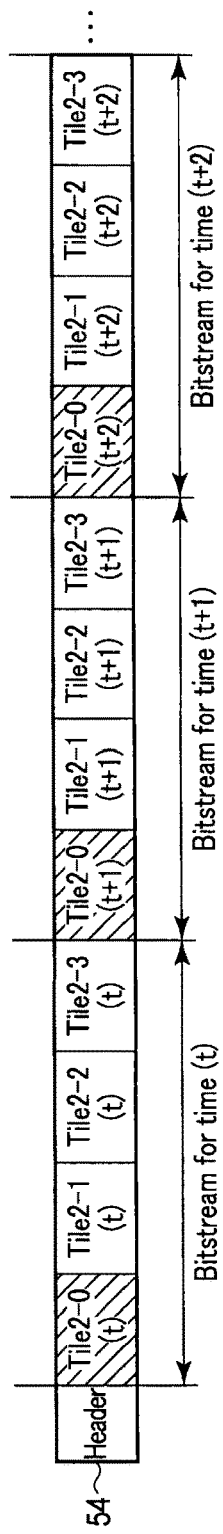
FIG. 21 is a diagram illustrating a combined bitstream generated by the video playback apparatus in FIG. 20.

Specifically, the combiner 503 performs combination on the second bitstream 53-2 to generate the combined bitstream 54 illustrated in FIG. 21 or FIG. 22. In these examples, the stream controller 502 requests transmission of a bitstream for a tile 1, a tile 2, and a tile 4 in the partitioned second bitstream 45. The second bitstream 53-2 includes a bitstream 53-2-1 for the tile 1, a bitstream 53-2-2 for the tile 2, and a bitstream 53-2-3 for the tile 3 but does not include a bitstream for a tile 0.

The combined bitstream 54 in FIG. 21 includes compressed data of the tile 1, the tile 2, and the tile 3 originating from the partitioned second bitstream 45 but lacks compressed data of the tile 0. However, since the second video 12 is compressed so as to enable each region to be independently decoded, the second decoder 505 can decode each of the tiles 1, 2, and 3 based on the combined bitstream 54. The second decoder 505 fails to decode the tile 0, and thus copies the video in the corresponding region in the first decoded video 55-1 (that is, the video in the base layer) to the tile 0.

The combined bitstream 54 in FIG. 22 includes the compressed data of the tile 1, the tile 2, and the tile 3 originating from the partitioned second bitstream 45 and the tile 0 treated as a skip region. As described above, the second decoder 505 can decode each of the tiles 1, 2, and 3 based on the combined bitstream 54. Since the tile 0 corresponds to a skip region, the second decoder 505 copies a video for the corresponding region in the first decoded video 55-1 to the tile 0.

The first decoder 504 receives the first bitstream 53-1 from the stream controller 502. The first decoder 504 decodes the first bitstream 53-1 to generate the first decoded video 55-1. The first decoder 504 shares the same codec with the first compressor 401. The first decoder 504 outputs the first decoded video 55-1 to an external apparatus (for example, a display apparatus 130). The first decoded video 55-1 is saved in a buffer of the external apparatus so as to be displayed at the appropriate time for the user to view.

The second decoder 505 receives the combined bitstream 54 from the combiner 503. The second decoder 505 decodes the combined bitstream 54 to generate the second decoded video 55-2. The second decoder 505 shares the same codec with the second compressor 402. The second decoder 505 outputs the second decoded video 55-2 to an external apparatus (for example, the display apparatus 130). The second decoded video 55-2 is saved in the buffer of the external apparatus so as to be displayed at the appropriate time for the user to view.

The first decoder 504 and the second decoder 505 may omit output of one of the first and second decoded videos 55-1 and 55-2 to the external apparatus. For example, when receiving the second bitstream 53-2 is precluded, the first decoder 504 may output the first decoded video 55-1. When the second bitstream 53-2 can be received, the second decoder 505 may output the second decoded video 55-2.

Figure 25:
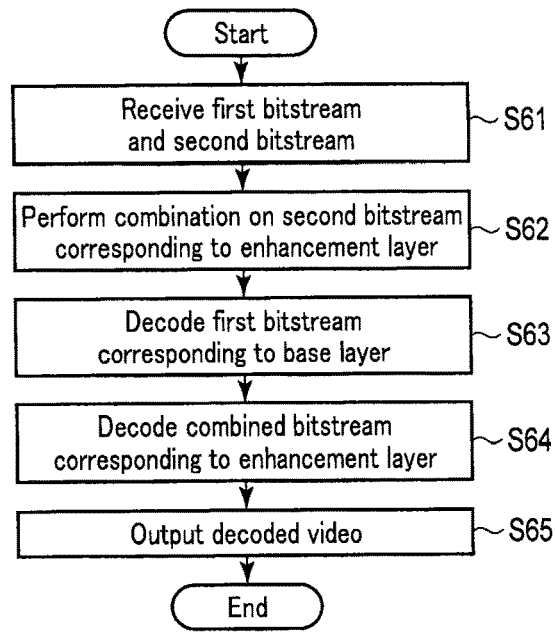
FIG. 25 is a flowchart illustrating a video playback process executed by the video playback apparatus in FIG. 20.

The video playback apparatus 500 in FIG. 20 executes a video playback process as illustrated in FIG. 25.

The communicator 301 receives the first bitstream 53-1 and the second bitstream 53-2 via the channel 120 (step S61).

The combiner 303 performs combination on the second bitstream 53-2 received in step S61 and corresponding to an enhancement layer and arranges the resultant bitstream into a regular format to generate the combined bitstream 54 (step S62).

The first decoder 504 decodes the first bitstream 53-1 received in step S61 and corresponding to the base layer to generate the first decoded video 55-1 (step S63).

The second decoder 505 decodes the combined bitstream 54 generated in step S62 and corresponding to an enhancement layer based on the first decoded video 55-1 generated in step S63, to generate the second decoded video 55-2 (step S64).

Moreover, the first decoder 504 and the second decoder 505 output the first decoded video 55-1 and the second decoded video 55-2 generated in step S63 and step S64, respectively, to an external apparatus (for example, the display apparatus 130) (step S65). The video playback process in FIG. 25 then ends.

Figure 23:
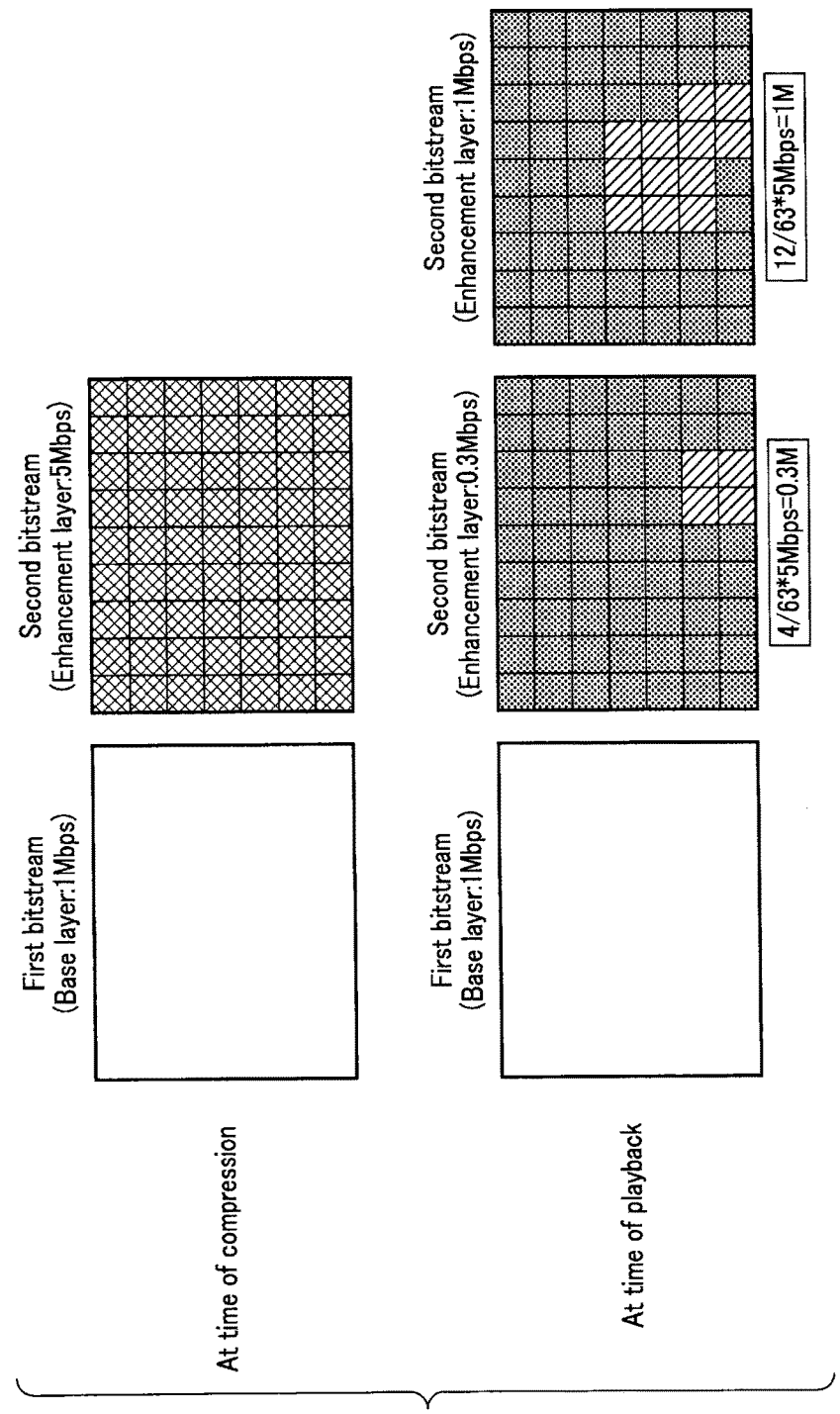
FIG. 23 is a diagram of operations of a video delivery system according to the second embodiment.

The video delivery system according to the second embodiment operates as illustrated in FIG. 23. In the example in FIG. 23, the second video 12 is partitioned into 63 tiles, the first bitstream 43 has a bit rate of 1 Mbps, and the second bitstream 44 has a bit rate of 5 Mbps. As described above, the first bitstream 43 and the partitioned second bitstream 45 resulting from partitioning of the second bitstream 44 into tiles are saved in the storage 404.

The stream controller 502 calculates the maximum value of W satisfying Expression (3) described above to be, for example, 4 in a derived manner. The stream controller 502 selects four specific regions, for example, based on a priority list, and generates region information that identifies the selected specific regions. As described above, the stream controller 502 can select the specific regions in accordance with the priorities of the regions to efficiently improve the subjective image quality of the displayed image. The stream controller 502 allows the communicator 301 to transmit the bitstream transmission request and region information.

As a result, the communicator 301 receives a bitstream for the four tiles corresponding to the specific regions in the partitioned second bitstream 45. That is, the second bitstream 53-2 does not include a bitstream for dotted tiles in FIG. 23. The combiner 503 combines the second bitstream 53-2 to generate the combined bitstream 54. The first decoder 504 decodes the first bitstream 53-1 to generate the first decoded video 55-1. The second decoder 505 decodes the combined bitstream 54 based on the first decoded video 55-1 to generate the second decoded video 55-2. The bit rate of the second decoded video 55-2 can be roughly estimated to be about 1.3 (=1+4×5/63) Mbps. It should be noted that the stream controller 502 can adjust the number of specific regions in accordance with an increase or a decrease in available bandwidth to flexibly change the bit rate of the second decoded video 55-2.

For example, when the available bandwidth increases, the stream controller 502 may calculate the maximum value of W satisfying Expression (3) described above to be, for example, 12 in a derived manner. In this case, the bit rate of the second decoded video 55-2 can be roughly estimated to be about 2 (=1+12×5/63).

As described above, the video delivery system according to the second embodiment corresponds to the above-described video delivery system according to the first embodiment which is modified for SVC. Thus, this video delivery system can not only exert effects identical or similar to the effects of the first embodiment but also provide various scalabilities.

Third Embodiment

A video delivery system according to a third embodiment corresponds to the video delivery system according to the video delivery system 100 in FIG. 1 in which the video compression apparatus 200 and the video playback apparatus 300 are modified into a video compression apparatus 600 and a video playback apparatus 700. The video compression apparatus 600 and the video playback apparatus 700 perform differential coding.

As illustrated in FIG. 26, the video compression apparatus 600 includes a first compressor 401, a second compressor 602, a partitioner 403, storage 404, a communicator 205, a converter 406, and a subtractor 607.

The first compressor 401 in FIG. 26 is different from the first compressor 401 in FIG. 19 in that the first compressor 401 in FIG. 26 outputs a first decoded video 47 to the subtractor 607 instead of a second compressor 402. A partitioner 403 in FIG. 26 is different from the partitioner 403 in FIG. 19 in that the partitioner 403 in FIG. 26 partitions a second bitstream 64 instead of a second bitstream 44.

The subtractor 607 receives a second video 12 from an image sensing apparatus 110 and receives a first decoded video 47 from the first compressor 401. The subtractor 607 subtracts the first decoded video 47 from the second video 12 to generate a differential video 62. The subtractor 607 outputs the differential video 62 to the second compressor 602.

The second compressor 602 receives the differential video 62 from the subtractor 607. The second compressor 602 sets a plurality of regions for the differential video 62. The second compressor 602 then compresses the differential video 62 for each of the plurality of set regions so as to enable each region to be independently decoded, thus obtaining a second bitstream 64. A codec for the second compressor 602 may be H.264 or HEVC. The second compressor 602 outputs the second bitstream 64 to the partitioner 403.

As illustrated in FIG. 27, the video playback apparatus 700 includes a communicator 301, a stream controller 502, a combiner 503, a first decoder 504, a second decoder 705, and an adder 706.

The first decoder 504 in FIG. 27 is different from a first decoder 504 in FIG. 20 in that the first decoder 504 in FIG. 27 outputs a first decoded video 55-1 to the adder 706 instead of a second decoder 505.

The second decoder 705 receives a combined bitstream 54 from a combiner 503. The second decoder 705 decodes the combined bitstream 54 to generate a decoded differential video 76. The second decoder 705 shares the same codec with the second compressor 602. The second decoder 705 outputs the decoded differential video 76 to the adder 706.

The adder 706 receives the first decoded video 55-1 from the first decoder 504 and receives the decoded differential video 76 from the second decoder 705. The adder 706 adds the first decoded video 55-1 and the decoded differential video 76 together to generate a second decoded video 75-2. The adder 706 outputs the second decoded video 75-2 to an external apparatus (for example, a display apparatus 130). The second decoded video 75-2 is saved in a buffer of the external apparatus so as to be displayed at the appropriate time for the user to view.

The first decoder 504 and the second decoder 706 may omit output of one of the first and second decoded videos 55-1 and 75-2 to the external apparatus. For example, when receiving the second bitstream 53-2 is precluded, the first decoder 504 may output the first decoded video 55-1. When the second bitstream 53-2 can be received, the adder 706 may output the second decoded video 75-2.

As described above, the video delivery system according to the third embodiment allows H.264 or HEVC to be utilized as a codec for an encoder or a decoder. Thus, this video delivery system allows effects identical or similar to the effects of the second embodiment to be exerted using widely distributed encoders and decoders compared to the video delivery system in the second embodiment.

In the description of the first to third embodiments, the video compression apparatus provides two types of bitstreams. However, the video compression apparatus may provide three or more types of bitstreams. The costs of the video compression apparatus increase consistently with the number of bitstreams provided by the video compression apparatus. However, the video compression apparatus enables a bitstream requested for transmission to be more flexibly selected, allowing the bandwidth to be more effectively utilized.

For example, a third compressor may be added to the video compression apparatus 200 in FIG. 2. The third compressor sets a target bit rate different from the target bit rate for the first video 11 and the second video 12, for a third video to generate a third bitstream.

Alternatively, the video compression apparatus 400 in FIG. 19 may be provided with a third compressor that generates an enhancement layer different from an enhancement layer generated by a second compressor 402. For example, the second compressor 402 may generate a first enhancement layer that allows PSNR scalability to be provided, and the third compressor may generate a second enhancement layer that allows resolution scalability to be provided. The second compressor 402 and the third compressor may be provided in parallel or one of the compressors may be cascaded to the other.

When the second compressor 402 and the third compressor are provided in parallel, a video playback apparatus 500 can optionally select a first enhancement layer and a second enhancement layer generated by the second compressor 402 and the third compressor, respectively (for example, based on a user request 32).

When the second compressor 402 is cascaded to the third compressor, the third compressor can very efficiently generate the second enhancement layer based on the first enhancement layer generated by the second compressor 402.

Moreover, the above-described first to third embodiments may be combined as needed. Such combination also allows exertion of effects identical or similar to the effects of the first to third embodiments.

The video compression apparatuses and video playback apparatuses described in the embodiments can be implemented using hardware such as a CPU, an LSI (Large-Scale Integration) chip, a DSP (Digital Signal Processor), an FPGA (Field Programmable Gate Array), and a GPU (Graphics Processing Unit). Furthermore, the video compression apparatuses and the video playback apparatuses may be implemented by allowing a processor, for example, a CPU, to execute programs (that is, by using software). Additionally, an image sensing apparatus may be implemented by combining an image sensor with the above-described hardware or software. The display apparatus may be implemented by combining a display with above-described hardware or software.

At least a part of the processing in the above-described embodiments can be implemented using a general-purpose computer as basic hardware. A program implementing the processing in each of the above-described embodiments may be stored in a computer readable storage medium for provision. The program is stored in the storage medium as a file in an installable or executable format. The storage medium is a magnetic disk, an optical disc (CD-ROM, CD-R, DVD, or the like), a magnetooptic disc (MO or the like), a semiconductor memory, or the like. That is, the storage medium may be in any format provided that a program can be stored in the storage medium and that a computer can read the program from the storage medium. Furthermore, the program implementing the processing in each of the above-described embodiments may be stored on a computer (server) connected to a network such as the Internet so as to be downloaded into a computer (client) via the network.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video compression apparatus comprising:
a first compressor configured to compress a first video in accordance with a first target bit rate to generate a first bitstream;
a second compressor configured to set regions in a second video and compress the regions in accordance with a second target bit rate larger than the first target bit rate so as to enable each region to be independently decoded, to generate a second bitstream;
a partitioner configured to partition the second bitstream according to the set regions to obtain a partitioned second bitstream; and
a communicator configured to receive region information indicating a specific region that corresponds to one or more regions and select and transmit a bitstream corresponding to the specific region from the partitioned second bitstream, wherein the region information is generated so that the specific region is selected in descending order of priority in each region, a first priority in a first region is higher than a second priority in a second region, and a first distance from the first region to one or more request regions requested by a user is smaller than a second distance from the second region to the request regions.

2. The apparatus according to claim 1, wherein
the first compressor is configured to set regions in the first video and compress the first video for each of the regions so as to enable each region to be independently decoded, to generate the first bitstream, and
the partitioner is configured to partition the first bitstream according to the set regions to obtain a partitioned first bitstream.

3. The apparatus according to claim 2, wherein the communicator is configured to select and transmit a bitstream corresponding to a region different from the specific region from the partitioned first bitstream.

4. The apparatus according to claim 1, wherein
the first compressor is configured to compress the first video to generate the first bitstream and a first decoded video, and
the second compressor is configured to compress the second video based on the first decoded video.

5. The apparatus according to claim 1, further comprising a subtractor configured to subtract a first decoded video from a third video to generate the second video, and wherein
the first compressor is configured to compress the first video to generate the first bitstream and the first decoded video.

6. The apparatus according to claim 1, wherein the first video and the second video are an identical video.

7. The apparatus according to claim 1, further comprising a converter configured to apply some or all of (a) an increase or a reduction in resolution, (b) an increase or a reduction in frame rate, (c) an increase or a reduction in pixel bit depth, (d) a geometric conversion, and (e) a change in angle of view to a third video to generate the first video.

8. The apparatus according to claim 1, wherein the specific region is determined based on some or all of (a) a bit rate of at least one of the first and second bitstreams, (b) at least one of a quantization parameter, motion information, and prediction mode information included in at least one of the first and second bitstreams, (c) a monitoring target included in the second video, (d) a user request, and (e) a distance from a predetermined position in a screen.

9. The apparatus according to claim 1, wherein a codec for the first compressor and the second compressor is one of H.264, HEVC, an H.264 SVC scheme, and an HEVC SVC scheme, and
the regions is obtained by applying one of (a) slice partitioning, (b) tile partitioning, and (c) both slice partitioning and tile partitioning to the second video.

10. The apparatus according to claim 1, wherein the first bitstream corresponds to a base layer, and the second bitstream corresponds to an enhancement layer.

11. The apparatus according to claim 10, wherein the enhancement layer allows one of resolution scalability, temporal scalability, dynamic range scalability, color space scalability, codec scalability, image quality scalability, bit rate scalability, and PSNR (Peak Signal-to-Noise Ratio) scalability to be provided.

12. A video playback apparatus comprising:
a controller configured to select a specific region requested for transmission from a second bitstream partitioned according to regions that are enabled to be independently decoded and generate region information indicative of the specific region, wherein the region information is generated so that the specific region is selected in descending order of priority in each region, a first priority in a first region is higher than a second priority in a second region, and a first distance from the first region to one or more request regions requested by a user is smaller than a second distance from the second region to the request regions;
a communicator configured to transmit the region information and receive a bitstream corresponding to at least some regions in a first bitstream partitioned according to the regions and a bitstream corresponding to the specific region in the second bitstream, wherein the first bitstream is generated by compressing a first video in accordance with a first target bit rate, and the second bitstream is generated by compressing the regions in a second video in accordance with a second target bit rate larger than the first target bit rate;
a combiner configured to combine the bitstream corresponding to the at least some regions in the first bitstream and the bitstream corresponding to the specific region in the second bitstream to obtain a combined bitstream; and
a decoder configured to decode the combined bitstream to obtain a decoded video.

13. The apparatus according to claim 12, wherein the controller is configured to predict an available bandwidth and determines a total number of specific regions based on the available bandwidth.

14. The apparatus according to claim 12, wherein the first bitstream corresponds to a base layer, and the second bitstream corresponds to an enhancement layer.

15. The apparatus according to claim 14, wherein the enhancement layer allows one of resolution scalability, temporal scalability, dynamic range scalability, color space scalability, codec scalability, image quality scalability, bit rate scalability, and PSNR (Peak Signal-to-Noise Ratio) scalability to be provided.

16. A video playback apparatus comprising:
a controller configured to select a specific region requested for transmission from a second bitstream partitioned according to regions that are enabled to be independently decoded and generate region information indicative of the specific region, wherein the region information is generated so that the specific region is selected in descending order of priority in each region, a first priority in a first region is higher than a second priority in a second region, and a first distance from the first region to one or more request regions requested by a user is smaller than a second distance from the second region to the request regions;
a communicator configured to transmit the region information and receive a first bitstream and a bitstream corresponding to the specific region in the second bitstream, wherein the first bitstream is generated by compressing a first video in accordance with a first target bit rate, and the second bitstream is generated by compressing the regions in a second video in accordance with a second target bit rate larger than the first target bit rate;
a first decoder configured to decode the first bitstream to obtain a first decoded video;
a combiner configured to perform combination on a bitstream corresponding to the specific region in the second bitstream to obtain a combined bitstream; and
a second decoder configured to decode the combined bitstream based on the decoded video to obtain a second decoded video.

17. The apparatus according to claim 16, wherein the second decoder is configured to copy, to a region different from the specific region in the second decoded video, a video of a corresponding region in the first decoded video.

18. The apparatus according to claim 16, wherein the combiner is configured to supplement a predetermined bitstream instead of a bitstream corresponding to a region different from the specific region to obtain the combined bitstream.

19. The apparatus according to claim 16, wherein the first bitstream corresponds to a base layer, and the second bitstream corresponds to an enhancement layer.

20. The apparatus according to claim 19, wherein the enhancement layer allows one of resolution scalability, temporal scalability, dynamic range scalability, color space scalability, codec scalability, image quality scalability, bit rate scalability, and PSNR (Peak Signal-to-Noise Ratio) scalability to be provided.

* * * * *